(12) United States Patent
Gutman et al.

(10) Patent No.: US 11,038,621 B2
(45) Date of Patent: Jun. 15, 2021

(54) SPECTRAL EFFICIENCY (SPEF) TO CHANNEL QUALITY INDICATOR (CQI) MAPPING ADAPTATION

(71) Applicant: QUALCOMM Incorporated, San Diego, CA (US)

(72) Inventors: Igor Gutman, Ramat Gan (IL); Parisa Cheraghi, San Diego, CA (US); Michael Levitsky, Rehovot (IL); Alexei Yurievitch Gorokhov, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 16/578,183

(22) Filed: Sep. 20, 2019

(65) Prior Publication Data
US 2021/0091881 A1    Mar. 25, 2021

(51) Int. Cl.
*H04L 12/26* (2006.01)
*H04L 1/00* (2006.01)
*H04L 25/02* (2006.01)

(52) U.S. Cl.
CPC .......... *H04L 1/0021* (2013.01); *H04L 1/0016* (2013.01); *H04L 1/0026* (2013.01); *H04L 25/0224* (2013.01)

(58) Field of Classification Search
CPC ..... H04L 1/1607; H04L 1/0026; H04L 1/203; H04L 1/1812; H04L 1/0003; H04L 1/0025; H04L 5/14; H04L 5/1438; H04L 5/0032; H04L 5/0023; H04L 5/0035; H04L 5/0055; H04L 5/0057; H04L 12/2869; H04L 12/5695; H04L 47/00; H04L 47/70; H04L 47/78; H04L 47/821; H04L 47/827; H04W 64/003; H04W 8/22; H04W 72/12; H04W 7/04
See application file for complete search history.

(56) References Cited

U.S. PATENT DOCUMENTS

2004/0081248 A1    4/2004  Parolari
2008/0049813 A1    2/2008  Kurose et al.
(Continued)

OTHER PUBLICATIONS

International Search Report and Written Opinion—PCT/US2020/051656—ISAEPO—dated Dec. 15, 2020.

*Primary Examiner* — Jung Liu
(74) *Attorney, Agent, or Firm* — Quarles & Brady LLP

(57) ABSTRACT

Aspects of the disclosure relate to dynamically adapting the mapping between spectral efficiencies and channel quality indicators in real-time based on the channel conditions. In some examples, a scheduled entity (e.g., a UE) may maintain two or more predefined tables or other mappings, each including a respective mapping between spectral efficiency threshold values and channel quality indicators for a respective channel type. The UE may then calculate respective weighted sums of the spectral efficiency threshold values across the two or more predefined tables based on the current wireless channel. For example, the UE may estimate the wireless channel and determine respective weights to be applied to the spectral efficiency threshold values across the two or more predefined tables based on the channel estimate. Other aspects, features, and embodiments are also claimed and described.

30 Claims, 11 Drawing Sheets

(56) References Cited

U.S. PATENT DOCUMENTS

| | | | |
|---|---|---|---|
| 2011/0044186 A1* | 2/2011 | Jung | H04L 1/1607 370/252 |
| 2013/0223294 A1* | 8/2013 | Karjalainen | H04W 64/003 370/277 |
| 2017/0141834 A1* | 5/2017 | Yang | H04B 7/0456 |
| 2020/0106536 A1* | 4/2020 | Bedekar | H04B 17/373 |
| 2020/0296741 A1* | 9/2020 | Ayala Romero et al. | G06N 3/08 |

* cited by examiner

SPECTRAL EFFICIENCY (SPEF) TO CHANNEL QUALITY INDICATOR (CQI) MAPPING ADAPTATION

TECHNICAL FIELD

The technology discussed below relates generally to wireless communication networks, and more particularly, to adapting spectral efficiency to channel quality indicator mapping based on channel conditions. Some embodiments and techniques enable and provide communication devices, methods, and systems to generate a mapping table (e.g., mapping spectral efficiency to channel quality indicator) as a weighted sum of predefined mapping tables (e.g., based the channel conditions).

INTRODUCTION

In wireless communication systems, such as those specified under standards for 5G New Radio (NR), an access point (e.g., a base station) may communicate with a user equipment (UE) (e.g., a smartphone). The communication can utilize a modulation and coding scheme (MCS), rank, and precoding matrix selected based on an estimate of the channel between the base station and the UE. To assist the UE in estimating the channel, the base station may transmit one or more reference signals, such as channel state information-reference signals (CSI-RS), to the UE. After channel estimation, the UE may return channel state feedback (CSF) indicating the quality of the channel to the base station. CSF may include, for example, a channel quality indicator (CQI) that indicates to the base station an MCS to use for transmissions to the UE.

As the demand for mobile broadband access continues to increase, research and development continue to advance communication technologies, including technologies for enhancing mapping of spectral efficiency to CQI in particular, not only to meet the growing demand for mobile broadband access, but to advance and enhance the user experience with mobile communications.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

According to some aspects, techniques discussed below enable and provide for communication components (e.g., UEs, smartphones, BSs, etc.) to dynamically modify operations based on changing communication conditions. For example, a UE may calculate spectral efficiency of a measured channel and map the spectral efficiency to a particular CQI for inclusion in CSF information.

Spectral efficiency can provide a measure of how efficiently channel bandwidth transmits data. It is typically expressed in terms of bits per second per hertz (or bits/s/Hz) and may be defined as a net data rate in bits per second divided by a channel bandwidth. According to some aspects, a UE may maintain, for example, one or more tables mapping spectral efficiencies to CQIs, and/or UE's may access one or more table(s) to identify a particular CQI based on a calculated spectral efficiency. In some examples, each table may be associated with a particular channel type, such as line-of-sight (LOS) channel type or a multi-path channel type (e.g., a multi-path channel type may correspond to a different fading channel classification). To effectively address downlink performance variations in different channel conditions, multiple mapping tables may be employed and stored within the UE.

Various aspects of the disclosure relate to dynamically adapting the mapping between spectral efficiencies and channel quality indicators in real-time based on the channel conditions. In some examples, a scheduled entity (e.g., a UE) may maintain two or more predefined spectral efficiency-CQI (SPEF-CQI mappings), each including a respective mapping between spectral efficiency threshold values and channel quality indicators. In some examples, the SPEF-CQI mappings may be predefined tables. Each of the predefined tables may be associated with a respective channel type. The UE may then calculate a weighted sum of the spectral efficiency threshold values across the two or more predefined tables based on the current wireless channel. For example, the UE may estimate the wireless channel and determine respective weights to be applied to each of the predefined tables based on the channel estimate. The weights may be determined, for example, based on the frequency selectivity or power delay profile correlation of the wireless channel or by utilizing a machine learning mechanism. Disclosed aspects include a variety of method, system, device, and apparatus embodiments.

In one example, a method for wireless communication at a scheduled entity in a wireless communication network is disclosed. The method can include estimating a wireless channel between the scheduled entity and a scheduling entity to obtain a channel estimate and determining a respective weight for each of two or more predefined spectral efficiency-channel quality indicator (SPEF-CQI) mappings based on the channel estimate. Each of the two or more predefined SPEF-CQI mappings can include a respective mapping between spectral efficiency (SPEF) threshold values and channel quality indicators (CQIs). The method also includes calculating respective weighted sums of corresponding ones of the SPEF threshold values across the two or more predefined SPEF-CQI mappings using the respective weights to produce a blended SPEF-CQI mapping for the wireless channel, calculating a current SPEF value for the wireless channel, and identifying a current CQI from the blended SPEF-CQI mapping that maps to the current SPEF value.

Another example provides a scheduled entity in a wireless communication network including a wireless transceiver, a memory, and a processor communicatively coupled to the wireless transceiver and the memory. The processor can be configured to estimate a wireless channel between the scheduled entity and a scheduling entity to obtain a channel estimate and determine a respective weight for each of two or more predefined spectral efficiency-channel quality indicator (SPEF-CQI) mappings based on the channel estimate. Each of the two or more predefined SPEF-CQI mappings can include a respective mapping between spectral efficiency (SPEF) threshold values and channel quality indicators (CQIs). The processor can also be configured to calculate respective weighted sums of corresponding ones of the SPEF threshold values across the two or more predefined SPEF-CQI mappings using the respective weights to produce a blended SPEF-CQI mapping for the wireless channel, calculate a current SPEF value for the wireless channel, and identify a current CQI from the blended SPEF-CQI mapping that maps to the current SPEF value.

Another example provides a scheduled entity in a wireless communication network. The scheduled entity can include means for estimating a wireless channel between the scheduled entity and a scheduling entity to obtain a channel estimate and means for determining a respective weight for each of two or more predefined spectral efficiency-channel quality indicator (SPEF-CQI) mappings based on the channel estimate. Each of the two or more predefined SPEF-CQI mappings can include a respective mapping between spectral efficiency (SPEF) threshold values and channel quality indicators (CQIs). The scheduled entity also includes means for calculating respective weighted sums of corresponding ones of the SPEF threshold values across the two or more predefined SPEF-CQI mappings using the respective weights to produce a blended SPEF-CQI mapping for the wireless channel, means for calculating a current SPEF value for the wireless channel, and means for identifying a current CQI from the blended SPEF-CQI mapping that maps to the current SPEF value.

Another example provides a non-transitory computer-readable medium including code for causing a scheduled entity to estimate a wireless channel between the scheduled entity and a scheduling entity to obtain a channel estimate and determine a respective weight for each of two or more predefined spectral efficiency-channel quality indicator (SPEF-CQI) mappings based on the channel estimate. Each of the two or more predefined SPEF-CQI mappings can include a respective mapping between spectral efficiency (SPEF) threshold values and channel quality indicators (CQIs). The non-transitory computer-readable medium also includes code for causing the scheduled entity to calculate respective weighted sums of corresponding ones of the SPEF threshold values across the two or more predefined SPEF-CQI mappings using the respective weights to produce a blended SPEF-CQI mapping for the wireless channel, calculate a current SPEF value for the wireless channel, and identify a current CQI from the blended SPEF-CQI mapping that maps to the current SPEF value.

Various method, system, device, and apparatus embodiments may also include additional features. For example, the scheduled entity may receive a channel state information-reference signal (CSI-RS) within a channel measurement resource from the scheduling entity and estimate the wireless channel based on the CSI-RS. As another example, each of the two or more predefined SPEF-CQI mappings may be predefined tables, each associated with a respective channel type.

In some examples, the scheduled entity may further be configured to multiply the respective weights by each of the SPEF threshold values within corresponding ones of the two or more predefined SPEF-CQI mappings to produce weighted SPEF threshold values and add corresponding ones of the weighted SPEF threshold values across each of the two or more predefined SPEF-CQI mappings to produce the blended SPEF-CQI mapping. The scheduled entity may further be configured to calculate a frequency selectivity of the wireless channel based on the channel estimate and determine the respective weight associated with each of the two or more predefined SPEF-CQI mappings based on the frequency selectivity of the wireless channel. For example, the scheduled entity may access a look-up table to determine the respective weights based on the frequency selectivity.

In some examples, the scheduled entity may further be configured to utilize machine learning to generate the respective weight associated with each of the two or more predefined SPEF-CQI mappings based on the channel estimate. In some examples, the blended SPEF-CQI mapping includes an adapted mapping between adapted SPEF threshold values and the CQIs. The scheduled entity may further be configured to select the current CQI corresponding to a maximum SPEF threshold value of the adapted SPEF threshold values that is less than or equal to the current SPEF.

In another example, a method for wireless communication at a scheduled entity in a wireless communication network is disclosed. The method can include estimating a channel between the scheduled entity and a scheduling entity to produce a channel estimation and determining a respective weight for each of two or more predefined tables based on the channel estimation. Each of the two or more predefined tables can include a respective mapping between spectral efficiency (SPEF) threshold values and channel quality indicators (CQIs) for a respective channel type. The method also includes calculating a weighted sum of the two or more predefined tables using the respective weights to produce a current table for the channel, calculating a current SPEF value for the channel, and identifying a current CQI from the current table that maps to the current SPEF value.

Another example provides a scheduled entity in a wireless communication network including a wireless transceiver, a memory, and a processor communicatively coupled to the wireless transceiver and the memory. The processor can be configured to estimate a channel between the scheduled entity and a scheduling entity to produce a channel estimation and determine a respective weight for each of two or more predefined tables based on the channel estimation. Each of the two or more predefined tables includes a respective mapping between spectral efficiency (SPEF) threshold values and channel quality indicators (CQIs) for a respective channel type. The processor can also be configured to calculate a weighted sum of the two or more predefined tables using the respective weights to produce a current table for the channel, calculate a current SPEF value for the channel, and identify a current CQI from the current table that maps to the current SPEF value.

Another example provides a scheduled entity in a wireless communication network. The scheduled entity can include means for estimating a channel between the scheduled entity and a scheduling entity to produce a channel estimation and means for determining a respective weight for each of two or more predefined tables based on the channel estimation. Each of the two or more predefined tables can include a respective mapping between spectral efficiency (SPEF) threshold values and channel quality indicators (CQIs) for a respective channel type. The scheduled entity also includes means for calculating a weighted sum of the two or more predefined tables using the respective weights to produce a current table for the channel, means for calculating a current SPEF value for the channel, and means for identifying a current CQI from the current table that maps to the current SPEF value.

Another example provides a non-transitory computer-readable medium including code for causing a scheduled entity to estimate a channel between the scheduled entity and a scheduling entity to produce a channel estimation and determine a respective weight for each of two or more predefined tables based on the channel estimation. Each of the two or more predefined tables can include a respective mapping between spectral efficiency (SPEF) threshold values and channel quality indicators (CQIs) for a respective channel type. The non-transitory computer-readable medium also includes code for causing the scheduled entity to calculate a weighted sum of the two or more predefined tables using the respective weights to produce a current table for the channel, calculate a current SPEF value for the channel, and identify a current CQI from the current table that maps to the current SPEF value.

These and other aspects will become more fully understood upon a review of the detailed description, which follows. Other aspects, features, and embodiments will become apparent to those of ordinary skill in the art, upon reviewing the following description of specific, exemplary embodiments of in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Figure 1:
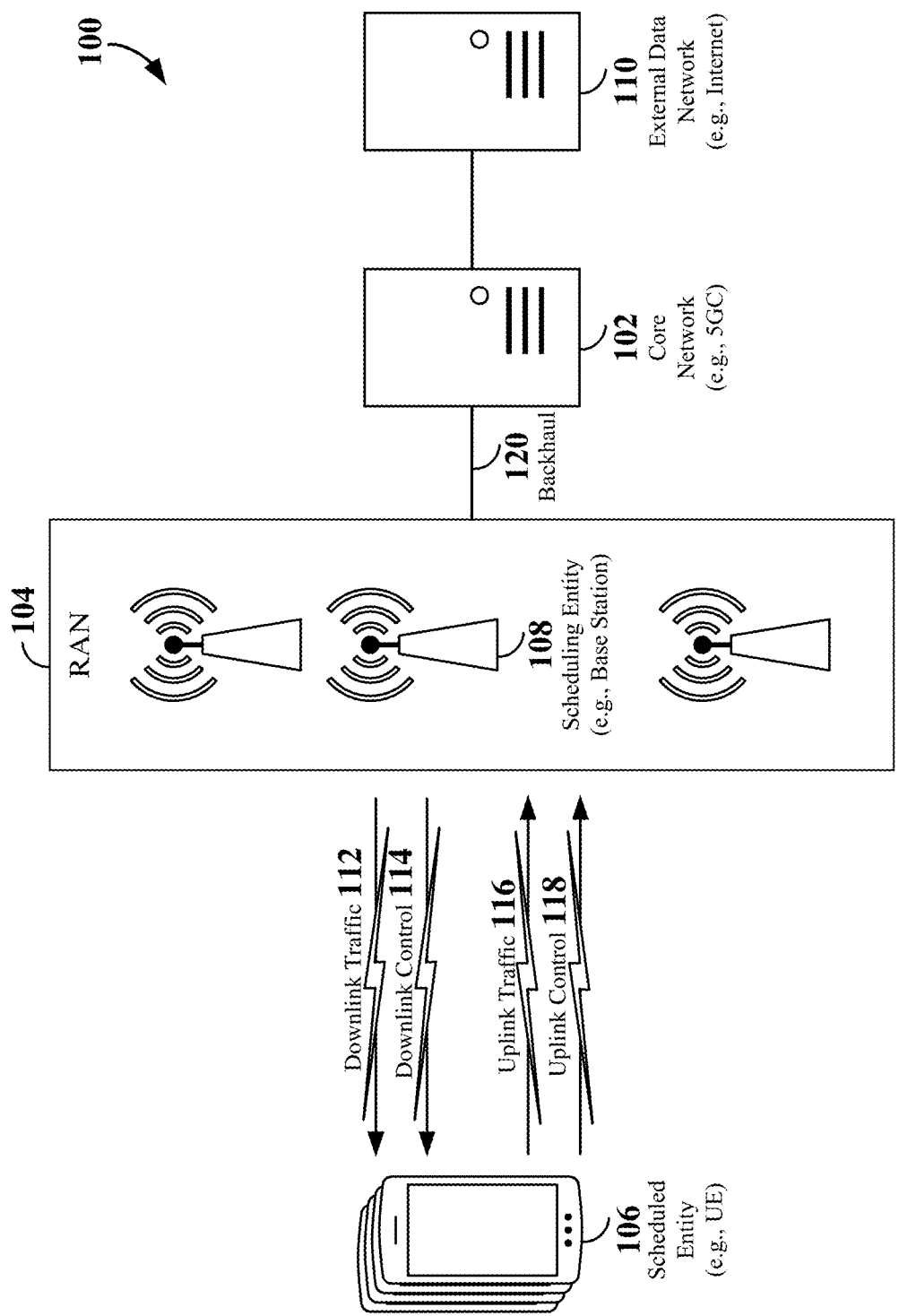
FIG. 1 is a schematic illustration of a wireless communication system according to some aspects.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT). A mobile apparatus may additionally be an automotive or other transportation vehicle, a remote sensor or actuator, a robot or robotics device, a satellite radio, a global positioning system (GPS) device, an object tracking device, a drone, a multicopter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). And as discussed more below, UEs may communicate directly with other UEs in peer-to-peer fashion and/or in relay configuration.

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
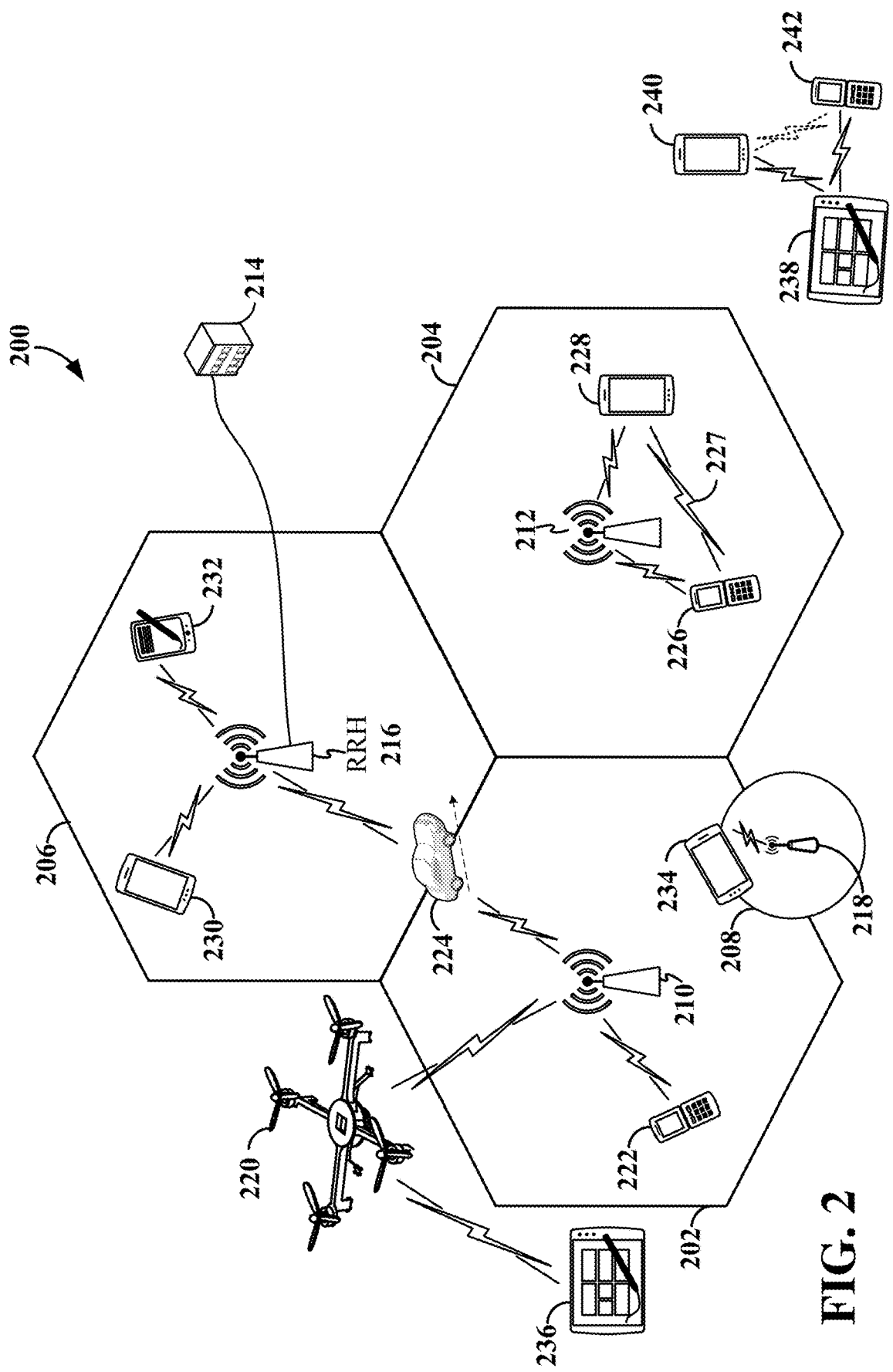
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

Within the RAN 200, the cells may include UEs that may be in communication with one or more sectors of each cell. Further, each base station 210, 212, 214, and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 238, 240, and/or 242 may be the same as the UE/scheduled entity 106 described above and illustrated in FIG. 1.

In some examples, an unmanned aerial vehicle (UAV) 220, which may be a drone or quadcopter, can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may each function as a scheduled entity or a non-primary (e.g., secondary) sidelink device. In still another example, a UE may function as a scheduling entity or scheduled entity in a device-to-device (D2D), peer-to-peer (P2P), vehicle-to-vehicle (V2V) network, vehicle-to-everything (V2X) and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources. In some examples, the sidelink signals 227 include sidelink traffic and sidelink control.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the radio access network 200 may further utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
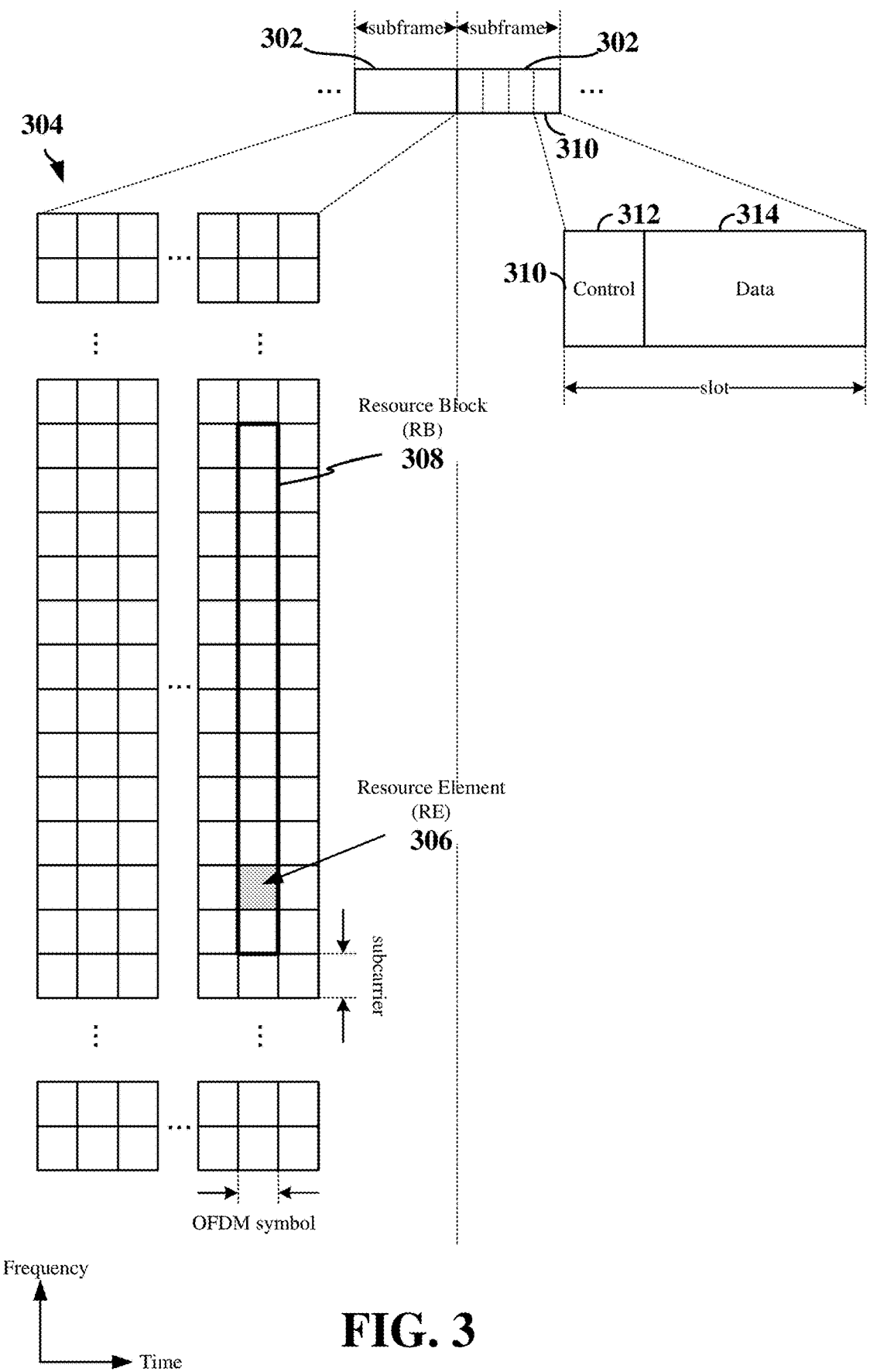
FIG. 3 is a diagram illustrating an example of a frame structure for use in a radio access network according to some aspects.

Referring now to FIG. 3, an expanded view of an exemplary DL subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

Scheduling of UEs (e.g., scheduled entities) for downlink or uplink transmissions typically involves scheduling one or more resource elements 306 within one or more sub-bands. Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals, including but not limited to a demodulation reference signal (DMRS), a channel state information-reference signal (CSI-RS), or a sounding reference signal (SRS). These pilots or reference signals may provide for a receiving device to perform channel estimation of the corresponding channel, which may enable coherent demodulation/detection of the control and/or data channels within the RB 308.

In a DL transmission, the transmitting device (e.g., the scheduling entity 108) may allocate one or more REs 306 (e.g., within a control region 312) to carry DL control information including one or more DL control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities. The PCFICH provides information to assist a receiving device in receiving and decoding the PDCCH. The PDCCH carries downlink control information (DCI) including but not limited to power control commands, scheduling information, a grant, and/or an assignment of REs for DL and UL transmissions. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc. In addition, the scheduling entity may further utilize one or more REs 306 to carry various pilots and reference signals, such as a CSI-RS and/or DMRS.

In an UL transmission, the transmitting device (e.g., the scheduled entity 106) may utilize one or more REs 306 to carry UL control information including one or more UL control channels, such as a physical uplink control channel (PUCCH), to the scheduling entity. UL control information may include a variety of packet types and categories, including pilots, reference signals (e.g., a SRS), and information configured to enable or assist in decoding uplink data transmissions (e.g., a DMRS). In some examples, the control information may include a scheduling request (SR), i.e., request for the scheduling entity to schedule uplink transmissions. Here, in response to the SR transmitted on the control channel, the scheduling entity may transmit downlink control information that may schedule resources for uplink packet transmissions. UL control information may also include HARQ feedback, channel state feedback (CSF), or any other suitable UL control information.

In addition to control information, one or more REs 306 (e.g., within the data region 314) may be allocated for user data traffic. Such traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry system information blocks (SIBs), carrying information that may enable access to a given cell.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above in connection with FIGS. 1-3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Figure 4:
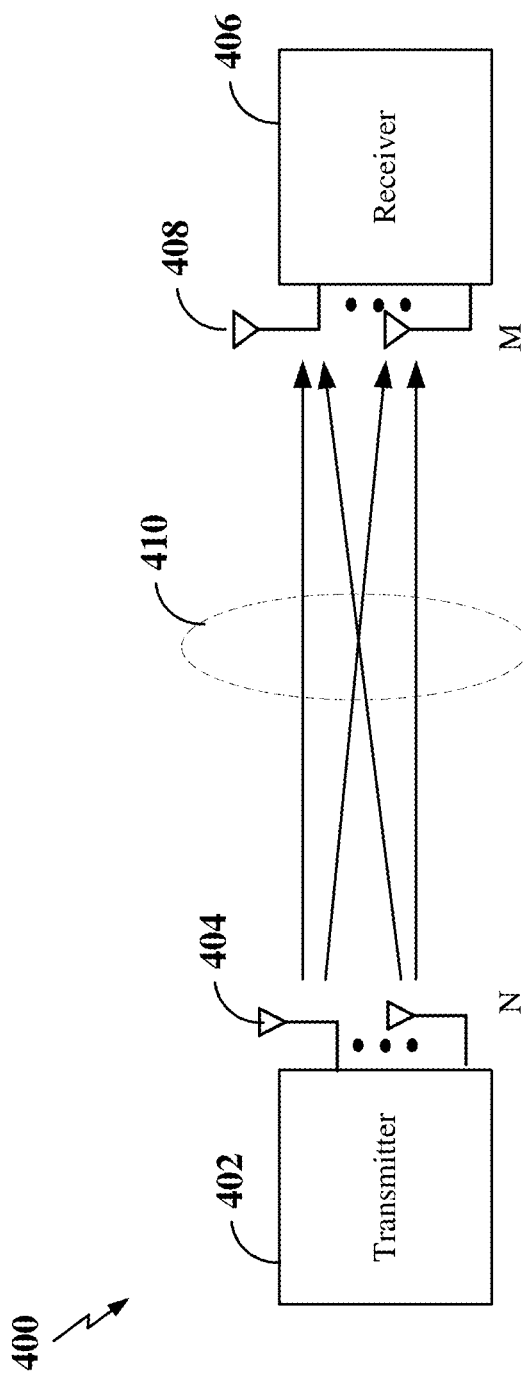
FIG. 4 is a block diagram illustrating a wireless communication system supporting beamforming and/or multiple-input multiple-output (MIMO) communication according to some aspects.

In some aspects of the disclosure, the scheduling entity and/or scheduled entity may be configured for beamforming and/or multiple-input multiple-output (MIMO) technology. FIG. 4 illustrates an example of a wireless communication system 400 supporting beamforming and/or MIMO. In a MIMO and/or beamforming system, a transmitter 402 includes multiple transmit antennas 404 (e.g., N transmit antennas) and a receiver 406 includes multiple receive antennas 408 (e.g., M receive antennas). Thus, there are N×M signal paths 410 from the transmit antennas 404 to the receive antennas 408. Each of the transmitter 402 and the receiver 406 may be implemented, for example, within a scheduling entity, a scheduled entity, or any other suitable wireless communication device.

The use of such multiple antenna technology enables the wireless communication system to exploit the spatial domain to support spatial multiplexing, beamforming, and transmit diversity. Beamforming is a signal processing technique that may be used at the transmitter 402 or receiver 406 to shape or steer an antenna beam (e.g., a transmit beam or receive beam) along a spatial path between the transmitter 402 and the receiver 406. Beamforming may be achieved by combining the signals communicated via antennas 404 or 408 (e.g., antenna elements of an antenna array module) such that some of the signals experience constructive interference while others experience destructive interference. To create the desired constructive/destructive interference, the transmitter 402 or receiver 406 may apply amplitude and/or phase offsets to signals transmitted or received from each of the antennas 404 or 408 associated with the transmitter 402 or receiver 406.

Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 400 is limited by the number of transmit or receive antennas 404 or 408, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In one example, as shown in FIG. 4, a rank-2 spatial multiplexing transmission on a 2×2 MIMO antenna configuration will transmit one data stream from each transmit antenna 404. Each data stream reaches each receive antenna 408 along a different signal path 410. The receiver 406 may then reconstruct the data streams using the received signals from each receive antenna 408.

In Time Division Duplex (TDD) systems, the uplink and downlink are reciprocal in that each uses different time slots of the same frequency bandwidth. As such, in TDD systems, the scheduling entity may assign the rank based on uplink SINR measurements (e.g., based on a Sounding Reference Signal (SRS) transmitted from the scheduled entity or other pilot signal). Based on the assigned rank, the scheduling entity may then transmit the CSI-RS with separate C-RS sequences for each layer to provide for multi-layer channel estimation. From the CSI-RS, the scheduled entity may measure the channel quality (e.g., Signal to Interference Plus Noise Ratio (SINR)) across layers and resource blocks and feed back the CQI and RI values, along with a precoding matrix indicator (PMI), within channel state feedback (CSF) to the scheduling entity for use in updating the rank and assigning resource elements for future downlink transmissions.

According to some aspects, channel quality measurements (e.g., SINRs) may be used (e.g., in real-time) to aid in providing CSF for ever-changing channel conditions. For example, channel quality measurements can be used to calculate, determine, produce, or obtain a spectral efficiency (SPEF) of a channel. CQI, for example, may be determined from the SPEF of the measured channel. For example, the receiver 406 may calculate the SPEF and then map the SPEF to a particular CQI. This CQI can be included in a CSF transmission (e.g., from UE to BS). In some examples, a receiver 406 may maintain a memory (e.g., one or more tables) mapping spectral efficiencies to CQIs. The receiver 406 can access the memory (or table(s)) to identify a particular CQI based on the calculated SPEF.

Figure 5:
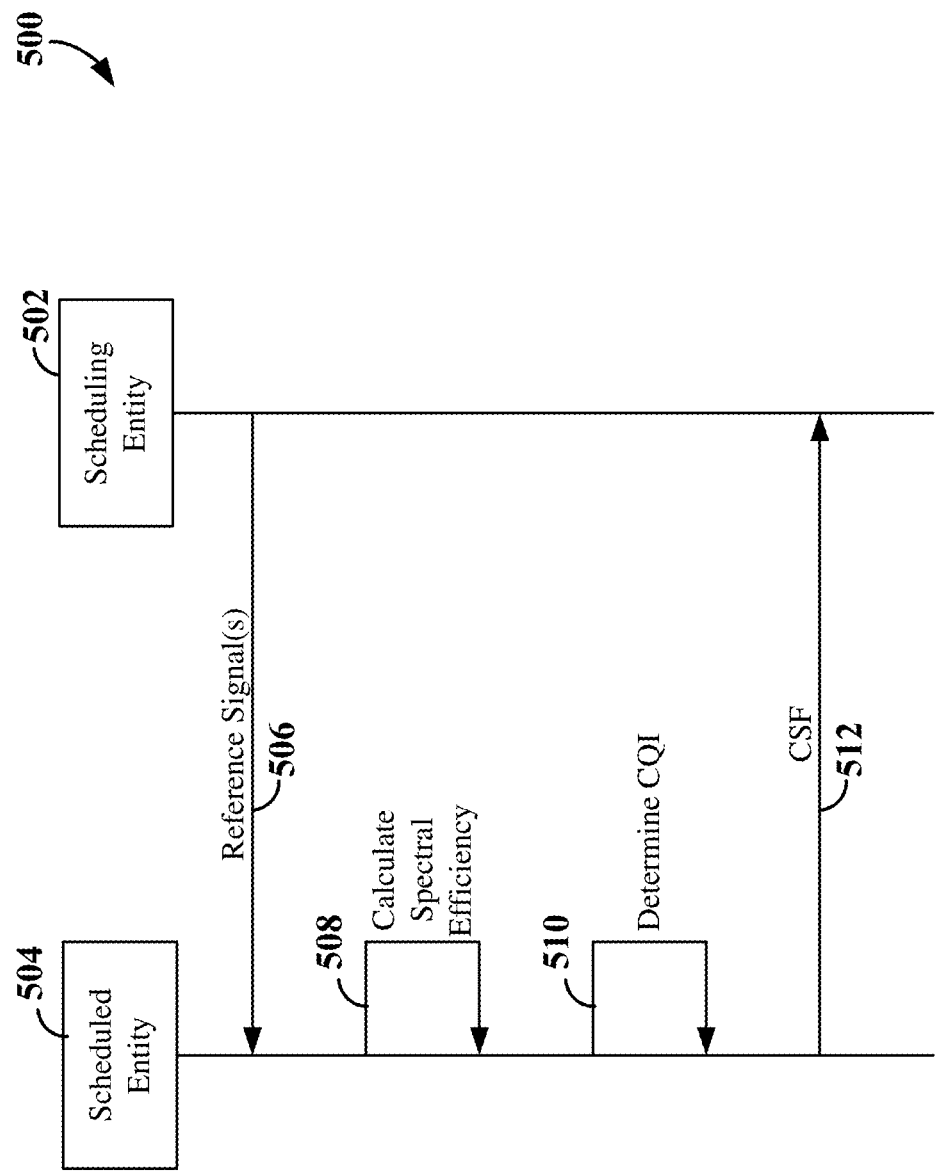
FIG. 5 is a signaling diagram illustrating exemplary signaling between a scheduling entity and a scheduled entity to provide channel state feedback (CSF) according to some aspects.

FIG. 5 is a signaling diagram illustrating exemplary signaling between a scheduling entity 502 and a scheduled entity 504 within a wireless network 500. In the illustrated scenario, the scheduled entity 504 can provide CSF to the scheduling entity 502. The wireless network 500 may correspond, for example, to the RAN 104 or 200 shown in FIG. 1 or 2. The scheduling entity 502 may correspond, for example, to a base station (e.g., gNB or eNB) or other scheduling entity as shown in FIGS. 1 and/2. The scheduled entity 504 may correspond, for example, to a UE or other scheduled node as shown in FIGS. 1 and/or 2.

At 506, the scheduling entity 502 may transmit a reference signal, such as a CSI-RS, to the scheduled entity 504. In some examples, the reference signal may include a plurality of reference signals. Reference signals may be transmitted via a respective channel measurement resource. Channel measurement resources may include time-frequency resources, along with a beam direction, within which a particular reference signal can be transmitted. For example, channel measurement resources may include a non-zero-power (NZP) CSI-RS resource. NZP resources can be utilized for channel measurement, along with one or more interference measurement resources that may be utilized for interference measurements. Interference measurement resources may include a zero-power (ZP) CSI-RS resource and an NZP CSI-RS resource with similar properties as the NZP CSI-RS resource utilized for channel measurement. In addition, each reference signal may include a number of pilots allocated within the respective channel measurement resource.

At 508, the scheduled entity 504 can use received data to generate and/or provide additional data for communication purposes. For example, the scheduled entity 504 may calculate the SPEF of a channel between the scheduling entity 502 and the scheduled entity 504 (e.g., based on received reference signals). In some examples, the scheduled entity 504 may measure the SINR of one or more of the reference signals and calculate the SPEF from the measured SINR. SPEF calculation can be used to generate additional data for channel feedback purposes.

At 510, for example, the scheduled entity 504 may determine a CQI from the SPEF. The CQI may include an index (e.g., a CQI index) ranging from 0 to 15. The CQI index may indicate, for example, the highest MCS at which the Block Error Rate (BLER) of the channel does not exceed 10%. For example, the scheduled entity 504 may access a predefined mapping between SPEF threshold values and CQI indexes maintained at a memory within the scheduled entity. In some example, the predefined mapping may include a predefined table. The scheduled entity 504 may select a CQI index as a function of a calculated SPEF. For example, a CQI index may be chosen based on a maximum SPEF threshold value that is less than or equal to the calculated SPEF of the channel.

Once selected, a CQI index can be fed back. For example, at 512, the scheduled entity 504 may transmit the CSF, including the selected CQI, along with a RI and PMI, to the scheduling entity 502.

As mentioned above, mappings between SPEFs and CQIs can used to enable real-time adaptations given changing channel conditions. These mappings can be stored in memory in one or more tables. While tables are used in the discussion herein, those skilled in the art will understand that various storage implementations and alternative manners may also be utilized. Further, there may be differing arrangements of or types of mappings to account for differing conditions, states, or types of a communication channel.

Figure 6:
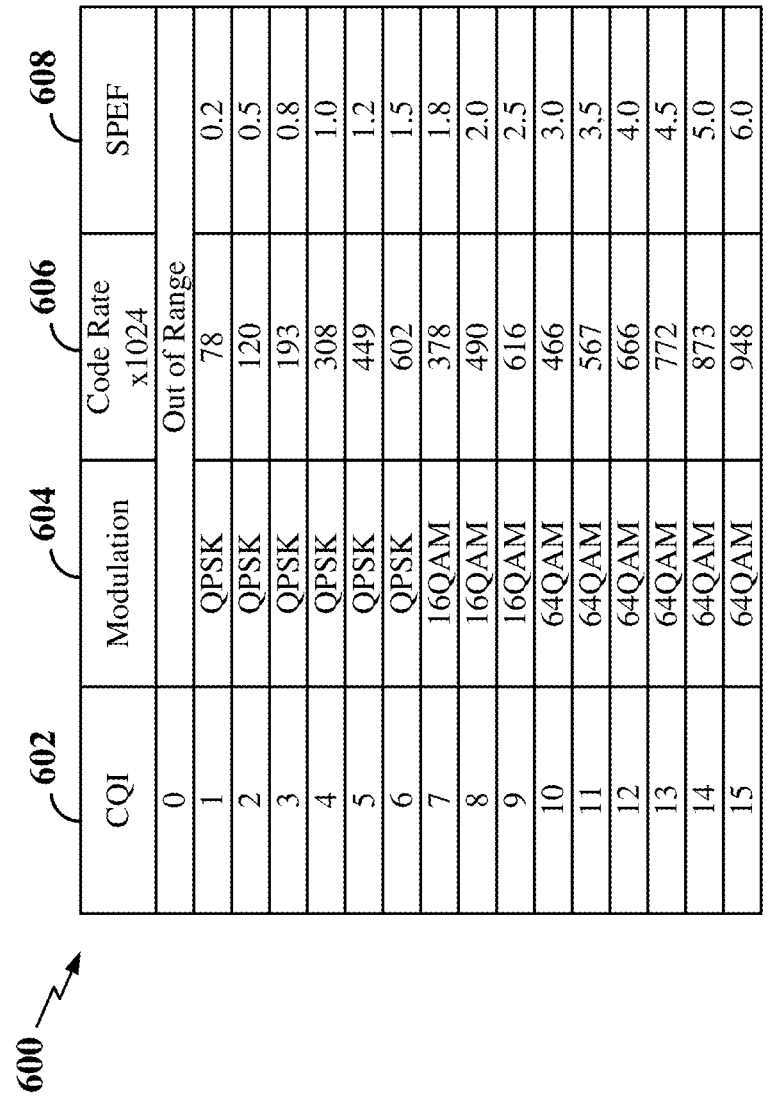
FIG. 6 is a diagram illustrating an exemplary table mapping spectral efficiency (SPEF) to channel quality indicators (CQI) according to some aspects.

According to some aspects, an example of a predefined table 600 mapping CQI to SPEF is shown in FIG. 6. The table 600 includes CQI indexes 602, modulations 604, code rates 606, and SPEF threshold values 608. Each of the CQI indexes 602 maps to one of the modulations 604 and one of the code rates 606. In addition, each of the CQI indexes 602 maps to one of the SPEF threshold values 608. In some examples, the calculated SPEF for a channel between a scheduled entity and a scheduling entity may be utilized to identify the SPEF threshold value 608 that has a maximum value less than or equal to the calculated SPEF. For example, if the calculated SPEF is 2.8 bits/s/Hz, the maximum SPEF threshold value 608 in the table shown in FIG. 6 that is less than or equal to the calculated SPEF is 2.5 bits/s/Hz. The CQI index 602 corresponding to the SPEF threshold value 608 of 2.5 bits/s/Hz in the table shown in FIG. 6 is 9. Thus, in this example, the scheduled entity would feed back a CQI index of 9 within the CSF. From the CQI index, the MCS (e.g., the modulation 604 and code rate 606) utilized by the scheduling entity for downlink transmissions to the scheduled entity may be identified in the table 600.

According to some examples, and as mentioned above, pre-defined mappings may be utilized to enable a variety of adaptive, real-time mapping configurations and/or scenarios. Pre-defined mappings can be pre-provisioned. Mappings may be tailored for use depending on a variety of contemplated or possible communication/channel scenarios. According to some implementations, a scheduled entity may maintain multiple SPEF-CQI mappings (e.g., via predefined tables 600) to account for different channel conditions. For example, each table 600 may be associated with a particular channel type, such as a line-of-sight (LOS) channel type or a multi-path channel type. In some examples, there may be multiple multi-path channel types, where each multi-path channel type corresponds to a different fading channel classification (e.g., different delay spread). Each table 600 may include a different set of SPEF threshold values 608 to avoid underestimation or overestimation of the CQI based on the channel conditions. If the wrong CQI is selected for inclusion in the CSF, the scheduled entity may either experience excessive BLER on the downlink or may not achieve the maximum possible throughput for the channel. For example, each table 600 may include the same CQI indexes 602, modulations 604 and code rates 606, but different SPEF threshold values 608 corresponding to one or more of the CQI indexes 602.

Yet, maintaining a separate table 600 for every potential channel type may not be practical. The number of tables 600 needed to achieve this may be large and there may not be sufficient or limited storage at the scheduled entity large numbers of tables. Therefore, in various aspects of the disclosure, the scheduled entity may be configured to implement a SPEF-CQI table mapping adaptation in real-time based on channel conditions.

Due to memory constraints or desired operational conditions, a scheduled entity may maintain a limited number of or only several predefined tables. For example, a UE may maintain in memory two or more predefined tables. Each table can include a respective mapping between SPEF threshold values and CQI indexes for a respective channel type. In an example, the scheduled entity may maintain a LOS channel type table, and three multi-path channel type tables covering a range of delay spreads (e.g., minimum delay spread, average or mean delay spread, and maximum delay spread). Other permutations of table numbers and types are also contemplated and possible.

By appropriately combining/summing weighted pre-defined mapping values to yield a blended table, a few table options can substitute for many, many tables. In this way, aspects enable efficient use of limited memory resources and can reduce complex processing associated with utilization with large numbers of table. Generally, according to some aspects, a scheduled entity may then calculate a weighted sum of the two or more predefined tables based on the current channel conditions to produce a current table for the channel. For example, the scheduled entity may estimate the channel and determine respective weights to be applied to each of the SPEF threshold values within each of the predefined tables based on the channel estimate. The weights may be determined, for example, based on the frequency selectivity in the frequency domain or power delay profile correlation in the time domain of the channel or by utilizing a machine learning mechanism. From a current table (or blended table), the scheduled entity may identify the current CQI threshold value corresponding to the maximum SPEF threshold value that is less than or equal to the calculated SPEF for the channel and feed back the current CQI to the scheduling entity within the CSF.

Figure 7:
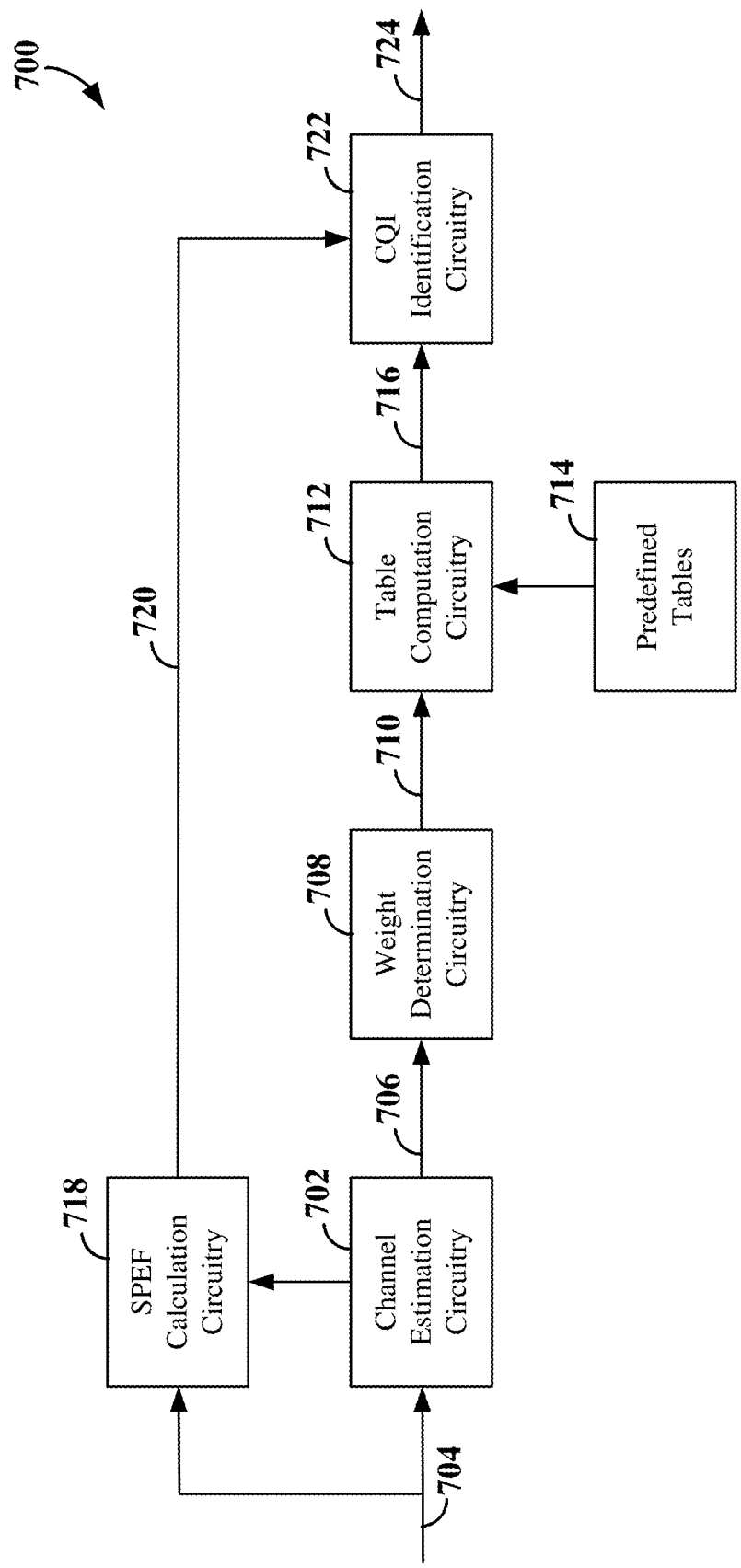
FIG. 7 is a block diagram illustrating exemplary processing circuitry of a scheduled entity according to some aspects.

FIG. 7 is a block diagram illustrating exemplary processing circuitry 700 of a scheduled entity according to some aspects. The scheduled entity may correspond to a UE or other scheduled entity, as shown in FIGS. 1, 2 and/or 5. The processing circuitry 700 includes channel estimation circuitry 702, weight determination circuitry 708, table computation circuitry 712, SPEF calculation circuitry 718, and CQI identification circuitry 722.

The channel estimation circuitry 702 is configured to estimate conditions of a wireless channel. It can do so based on receiving one or more reference signals 704 transmitted from a scheduling entity (e.g., a base station, such as a gNB or eNB, or other scheduling entity). For example, the one or more reference signals may be transmitted within a channel measurement resource and/or one or more interference measurement resources. As an example, the channel measurement resource may include a NZP CSI-RS resource that may be utilized for channel measurement. In addition, the interference measurement resources may include a ZP CSI-RS and an NZP CSI-RS with similar properties as the NZP CSI-RS utilized for channel measurement.

The channel estimation circuitry 702 is further configured to utilize the one or more reference signals to estimate a channel between the scheduled entity and the scheduling entity and produce a channel estimate 706. For example, the channel estimate 706 may include a vector $\{h_k\}_{k=1}^{K}$, where K is the number of allocated pilots in the allocated resource (e.g., channel measurement resource), k is the index of the pilot, and $h_k$ is the channel response coefficient at pilot k. In some examples, the channel response coefficients may be selected from preconfigured values based on one or more estimated parameters, such as the signal-to-noise ratio (SNR), Doppler, delay spread, and/or other suitable parameters, which may be estimated using a tracking reference signal (TRS) or PDSCH.

The weight determination circuitry 708 is configured to determine one or more weights 710 for application to existing mapping values. For example, according to some implementations, the weight determination circuitry can 708 determines weights to be applied to each of two or more predefined tables 714, each mapping SPEF threshold values to CQI for a particular channel type. Weights used for the various tables may be the same or differing values. Weights used for the tables may not change and/or may change over time during operations. For example, the predefined tables 714 may include a table including SPEF threshold values for a LOS channel, while another one or more tables may include SPEF threshold values for multi-path channels. The weights 710 can be determined, for example, based on the channel estimate 706. Using a variety of weighting factors enables use of fewer tables thereby helping to efficiently use memory and processing resources.

In some examples, the weight determination circuitry 708 may calculate a frequency selectivity of the channel in the frequency domain or the time domain. In the time domain, the frequency selectivity may be represented by a power delay profile (PDP) correlation. The frequency selectivity (or PDP correlation) indicates a correlation between each of the predefined tables 714 and the current channel. The weight determination circuitry 708 may then utilize the frequency selectivity to determine the weights 710. For example, the weight determination circuitry 708 may calculate the frequency selectivity, $\alpha$, of the channel as:

$$\alpha = \frac{(\Sigma_k |h_k|^2)^2}{\Sigma_k |h_k|^4} \qquad \text{(Equation 1)}$$

The weights 710 $\{\omega_n\}_{n=1}^{N}$ may then be given by:

$$\{\omega_n\}_{n=1}^{N} = LUT(\alpha), \qquad \text{(Equation 2)}$$

where $LUT(\alpha)$ corresponds to a look-up table (LUT) of respective sets of weights, with each set of weights ($\omega_n$) further corresponding to a particular frequency selectivity ($\alpha$). Each set of weights ($\omega_n$) includes a number N of weights. Here, the number N of weights in each set is equal to the number of predefined tables 714, where each predefined table 714 corresponds to a particular channel type. Thus, each set of weights ($\omega_n$) includes a respective weight to be applied to each of the predefined tables 714, where the sum of all of the weights equals one (e.g., $\Sigma_{n=1}^{N} \omega_n = 1$). In some examples, the weights in the LUT may be determined offline by calculating the normalized projection of the channel with selectivity a on each of the N predefined channels corresponding to the N predefined tables.

In other examples, the weight determination circuitry 708 may utilize machine learning to generate the respective weight 710 to be applied to each predefined table 714 based on the channel estimate 706. For example, the weight determination circuitry 708 may include a neural network trained such that the output determines the set of weights 710 for the current channel. In this example, the weights 710 $\{\omega_n\}_{n=1}^{N}$ may be given by:

$$\{\omega_n\}_{n=1}^{N} = ML(\{h_k\}_{k=1}^{K}) \qquad \text{(Equation 3)}$$

As another example, the weight determination circuitry 708 may train the neural network to output the final (current) table for the channel. In this example, the weight determination circuitry 708 and table computation circuitry 712 may collectively form the neural network.

The table computation circuitry 712 receives various inputs and outputs blended, weighted values to yield adaptive, real-time information for channel feedback purposes. According to some implementations, the table computation circuitry 712 is configured to receive a set of weights 710 from the weight determination circuitry 710 and to apply the set of weights 710 to the two or more predefined tables 714 to produce the current table 716 for the channel. The current table may be a real-time generated table containing blended, weighted values that are adapted for a given set of real-time parameters. The current table can generally refer to a table produced from blending (e.g., summing) weighted values from other pre-defined tables used for current operations (i.e., operations being performed in real time). Such current tables may be stored and re-used, and/or flushed so that another current table can be generated. Current table values can be based on application of weights applied to previously existing tables. Generally, weights may be applied as fractions or ratios such that values from several tables may be appropriately blended (e.g., summed) to yield a value having various constituent components from two or more existing values (e.g. from two or more previously defined tables).

By applying mathematical operations, the table computation circuitry 712 can output adaptive, real time SPEF/CQI mapping values. For example, the table computation circuitry 712 may, for example, multiply respective weights associated with each table 714 by each of the SPEF threshold values in that table 714 to produce weighted SPEF threshold values for that table 714. For example, the table computation circuitry 712 may multiply a first weight corresponding to a first predefined table 714 by each of the SPEF threshold values in the first table to produce first weighted SPEF threshold values, and multiply a second weight corresponding to a second predefined table 714 by each of the SPEF threshold values in the second table to produce second weighted SPEF threshold values. In an example including four predefined tables 714, a particular set of weights to be applied to the four predefined tables may include 0.1, 0.2, 0.3, and 0.4, such that each of the SPEF threshold values in a first predefined table is multiplied by 0.1, each of the SPEF threshold values in a second predefined table is multiplied by 0.2, each of the SPEF threshold values in a third predefined table is multiplied by 0.3, and each of the SPEF threshold values in a fourth predefined table is multiplied by 0.4.

The table computation circuitry 712 may then add corresponding ones of the weighted SPEF threshold values across each of the weighted tables to produce current SPEF threshold values for the current table 716 for the channel. For example, referring to the example table given in FIG. 6, for the CQI index 602 of 1, the weighted SPEF threshold values across each of the predefined tables mapping to the CQI index of 1 may be added together to produce the current SPEF threshold value for the CQI index of 1. Other SPEF threshold values for the current table 716 (e.g., one for each of the other CQI indexes) may be similarly computed.

The SPEF calculation circuitry 718 is configured to calculate a current SPEF value 720 for the current channel. The current SPEF value 720 can be calculated based on the channel estimate 706 and/or the one or more reference signals 704. For example, the current SPEF value may be calculated as a function of each of the channel measurement resource and interference measurement resources.

The CQI identification circuitry 722 is configured to receive the current table 716 and the current SPEF value 720 and to identify a current CQI 724 from the current table 716 that maps to the current SPEF value 720. For example, the CQI identification circuitry 722 may be configured to identify the maximum current SPEF threshold value in the current table that is less than or equal to the SPEF value 720 of the channel. The CQI identification circuitry 722 may then be configured to map the maximum current SPEF threshold value to the corresponding CQI (e.g., the current CQI 724) in the current table 716 and output the current CQI 724. The current CQI 724 may then be included within CSF fed back to the scheduling entity.

Figure 8:
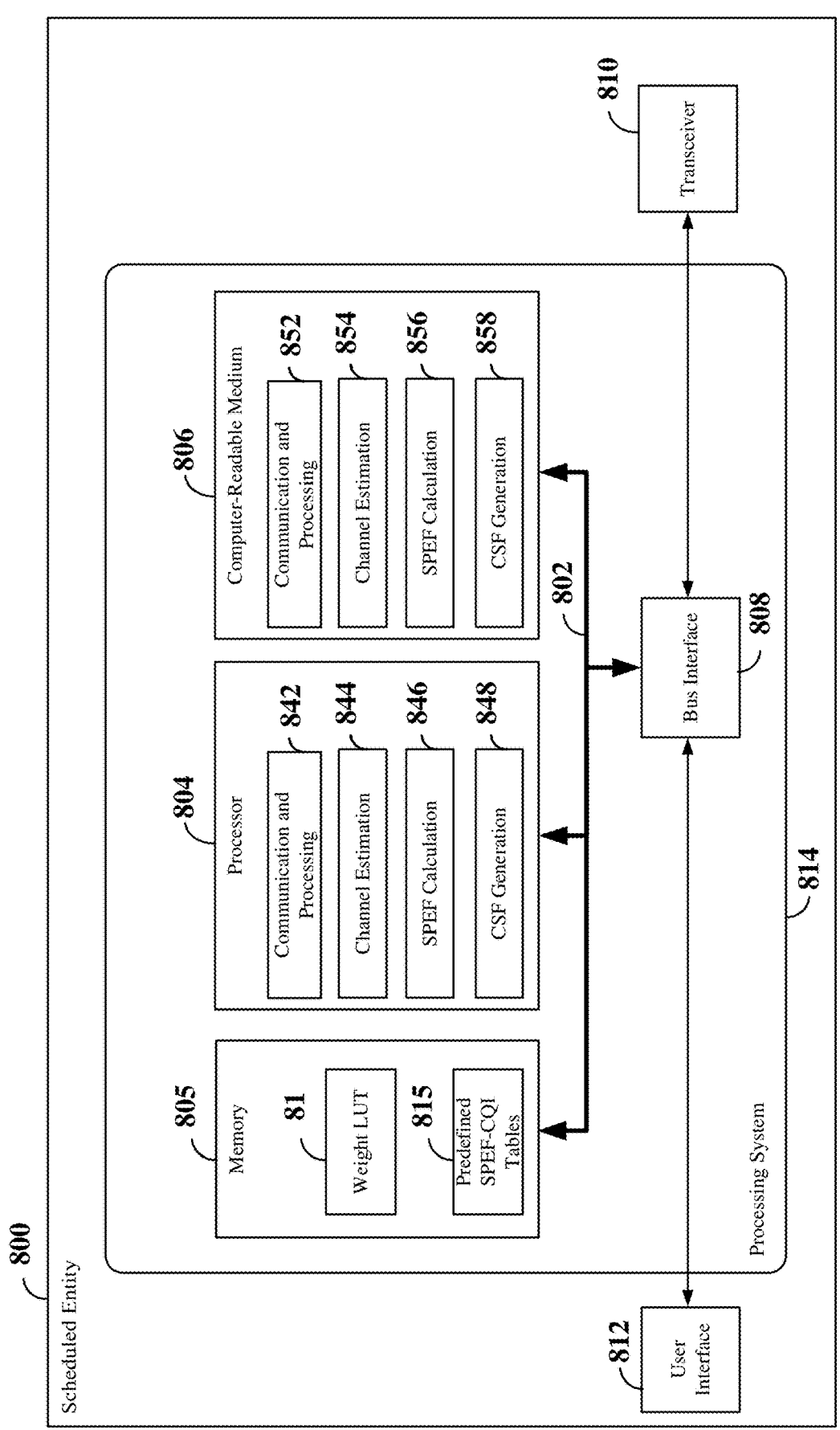
FIG. 8 is a block diagram illustrating an example of a hardware implementation for a scheduled entity employing a processing system according to some aspects.

FIG. 8 is a conceptual diagram illustrating an example of a hardware implementation for an exemplary scheduled entity 800 employing a processing system 814. For example, the scheduled entity 800 may be a UE as illustrated in any one or more of FIGS. 1, 2, and/or 5-7.

The scheduled entity 800 may be implemented with a processing system 814 that includes one or more processors 804. Examples of processors 804 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduled entity 800 may be configured to perform any one or more of the functions described herein. That is, the processor 804, as utilized in a scheduled entity 800, may be used to implement any one or more of the processes described below. The processor 804 may in some instances be implemented via a baseband or modem chip and in other implementations, the processor 804 may itself comprise a number of devices distinct and different from a baseband or modem chip (e.g., in such scenarios is may work in concert to achieve embodiments discussed herein). And as mentioned above, various hardware arrangements and components outside of a baseband modem processor can be used in implementations, including RF-chains, power amplifiers, modulators, buffers, interleavers, adders/summers, etc.

In this example, the processing system 814 may be implemented with a bus architecture, represented generally by the bus 802. The bus 802 may include any number of interconnecting buses and bridges depending on the specific application of the processing system 814 and the overall design constraints. The bus 802 communicatively couples together various circuits including one or more processors (represented generally by the processor 804), a memory 805, and computer-readable media (represented generally by the computer-readable medium 806). The bus 802 may also link various other circuits such as timing sources, peripherals, voltage regulators, and power management circuits, which are well known in the art, and therefore, will not be described any further. A bus interface 808 provides an interface between the bus 802 and a transceiver 810. The transceiver 810 provides a means for communicating with various other apparatus over a transmission medium (e.g., air interface). A user interface 812 (e.g., keypad, display, speaker, microphone, joystick) may also be provided.

The processor 804 is responsible for managing the bus 802 and general processing, including the execution of software stored on the computer-readable medium 806. The software, when executed by the processor 804, causes the processing system 814 to perform the various functions described below for any particular apparatus. The computer-readable medium 806 and the memory 805 may also be used for storing data that is manipulated by the processor 804 when executing software.

One or more processors 804 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 806.

The computer-readable medium 806 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 806 may reside in the processing system 814, external to the processing system 814, or distributed across multiple entities including the processing system 814. The computer-readable medium 806 may be embodied in a computer program product. In some examples, the computer-readable medium 806 may be part of the memory 805. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 804 may include circuitry configured for various functions. For example, the processor 804 may include communication and processing circuitry 842, configured to communicate with a base station. In some examples, the communication and processing circuitry 842 may include one or more hardware components that provide the physical structure that performs processes related to wireless communication (e.g., signal reception and/or signal transmission) and signal processing (e.g., processing a received signal and/or processing a signal for transmission).

In some examples, the communication and processing circuitry 842 may be configured to generate and transmit an uplink beamformed signal to a scheduling entity at a mmWave frequency or a sub-6 GHz frequency via the transceiver 810. The communication and processing circuitry 842 may further be configured to receive and process a downlink mmWave or sub-6 GHz beamformed signal from the scheduling entity. In some examples, the downlink beamformed signal may utilize a particular MCS, rank, and PMI selected by the scheduling entity based on CSF provided by the scheduled entity. For example, the communication and processing circuitry 842 may further be configured to receive one or more reference signals (e.g., CSI-RS) within one or more resources (e.g., a channel measurement resource and/or interference measurement resources) from the scheduling entity on a current downlink beam and to transmit CSF to the scheduling entity in response to the reference signal(s). The CSF may include, for example, the CQI, PMI, and RI. The communication and processing circuitry 842 may further be configured to execute communication and processing software 852 stored in the computer-readable medium 806 to implement one or more of the functions described herein.

The processor 804 may further include channel estimation circuitry 844, configured to estimate a channel between the scheduled entity 800 and the scheduling entity to produce a channel estimate. The channel estimation circuitry 844 may correspond, for example, to the channel estimation circuitry 702 shown in FIG. 7. In some examples, the channel estimation circuitry 844 may be configured to estimate the channel as a vector of channel response coefficients, each corresponding to a pilot within a CSI-RS channel measurement resource received via the communication and processing circuitry 842 and the transceiver 810. The channel estimation circuitry 844 may further be configured to execute channel measurement software 854 stored in the computer-readable medium 806 to implement one or more of the functions described herein.

The processor 804 may further include SPEF calculation circuitry 846, configured to calculate a current SPEF value for the channel between the scheduled entity 800 and the scheduling entity. The SPEF calculation circuitry 846 may, for example, correspond to the SPEF calculation circuitry 718 shown in FIG. 7. In some examples, the SPEF calculation circuitry 846 may be configured to calculate the current SPEF value as a function of one or more channel measurement and/or interference measurement resources received via the communication and processing circuitry 842 and the transceiver 810. The SPEF calculation circuitry 846 may further be configured to execute SPEF calculation software 856 stored in the computer-readable medium to implement one or more of the functions described herein.

The processor 804 may further include CSF generation circuitry 848, configured to generate the CSF including the CQI, PMI, and RI for transmission to the scheduling entity. The CSF generation circuitry 848 may correspond, for example, to the weight determination circuitry 708, table computation circuitry 712, and CQI identification circuitry 722 shown in FIG. 7. In some examples, the CSF generation circuitry 848 may be configured to utilize the current SPEF value calculated by the SPEF calculation circuitry 846 to determine the CQI index. For example, the CSF generation circuitry 848 may be configured to determine a respective weight to be applied to each of two or more predefined SPEF-CQI tables 815. The weights can be determined, for example, based on the channel estimate determined by the channel estimation circuitry 844. Each of the two or more predefined SPEF-CQI tables 815 may be associated with a different channel type, such as a LOS channel or multi-path channel. In addition, each of the predefined tables 815 may be stored, for example, in memory 805.

In some examples, the CSF generation circuitry 848 may calculate a frequency selectivity of the channel in the frequency domain or the time domain that indicates a correlation between each of the predefined tables 815 and the current channel. The CSF generation circuitry 848 may then access a weight LUT 818 stored, for example, in memory 805 to determine the weights. The weight LUT 818 may include respective sets of weights, each mapping to a different frequency selectivity or range of frequency selectivities. The CSF generation circuitry 848 may then calculate a weighted sum of the two or more predefined tables 815 using the set of weights to produce a current table for the channel. In some examples, the CSF generation circuitry 848 may multiply the respective weight associated with each predefined table 815 by each of the SPEF threshold values in that table 815 to produce weighted SPEF threshold values for that table 815. The CSF generation circuitry 848 may then add corresponding ones of the weighted SPEF threshold values across each of the tables 815 to produce current SPEF threshold values for the current table for the channel. In other examples, the CSF generation circuitry 848 may utilize machine learning to generate the weights and/or produce the current table based on the channel estimate.

The CSF generation circuitry 848 may further be configured to identify a current CQI from the current table that maps to the current SPEF value calculated by the SPEF calculation circuitry 846. For example, the current table may include an adapted mapping between adapted SPEF threshold values and the CQI indexes. The CSF generation circuitry 848 may be configured to identify the maximum SPEF threshold value of the adapted SPEF threshold values in the current table that is less than or equal to the current SPEF value of the channel. The CSF generation circuitry 848 may then be configured to select the current CQI corresponding to the maximum SPEF threshold value in the current table and to include the current CQI within the CSF fed back to the scheduling entity. The CSF generation circuitry 848 may further be configured to execute CSF generation software 858 stored in the computer-readable medium to implement one or more of the functions described herein.

Figure 9:
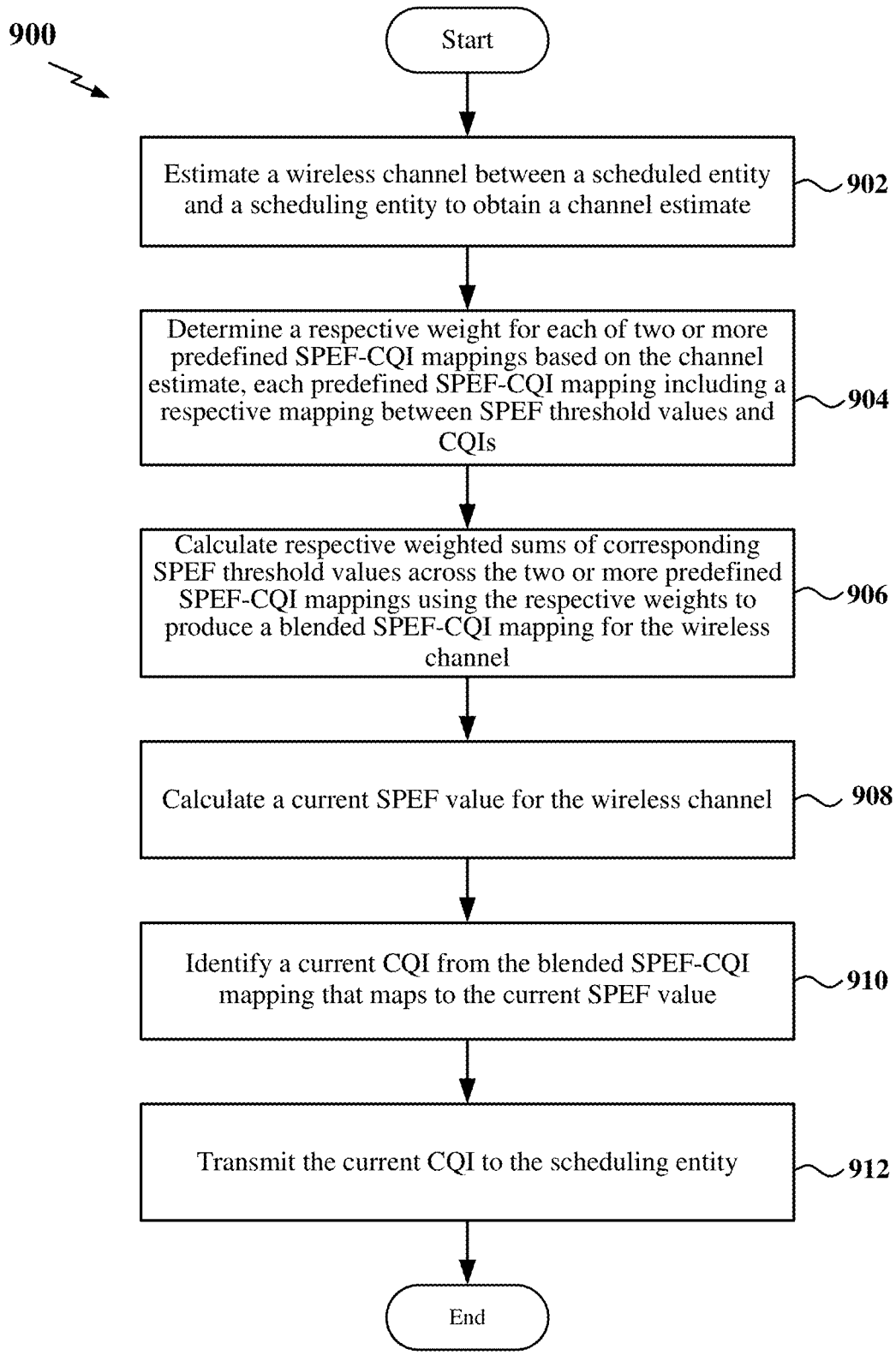
FIG. 9 is a flow chart of an exemplary method for a scheduled entity to adapt a SPEF to CQI mapping based on the channel conditions according to some aspects.

FIG. 9 is a flow chart 900 of a method for a scheduled entity (e.g., a UE) to adapt a SPEF to CQI mapping based on the channel conditions. As described below, some or all illustrated features may be omitted in a particular implementation within the scope of the present disclosure, and some illustrated features may not be required for implementation of all embodiments. In some examples, the method may be performed by the scheduled entity 800, as described above and illustrated in FIG. 8, by a processor or processing system, or by any suitable means for carrying out the described functions.

At block 902, the scheduled entity may estimate a wireless channel between the scheduled entity and the scheduling entity to obtain a channel estimate. In some examples, the scheduled entity may estimate the wireless channel based on one or more reference signals (e.g., CSI-RS). For example, the channel estimate may include a vector of channel response coefficients, each corresponding to a pilot within a CSI-RS channel measurement resource. For example, the channel estimation circuitry 844, communication and processing circuitry 842, and transceiver 810 shown and described above in connection with FIG. 8 may receive the one or more reference signals and estimate the wireless channel based on the one or more reference signals.

At block 904, the scheduled entity may determine a respective weight for each of two or more predefined SPEF-CQI mappings based on the channel estimate. Each predefined SPEF-CQI mapping may include, for example, a respective mapping between SPEF threshold values and CQI indexes. In some examples, each of the SPEF-CQI mappings may be a predefined table. Each of the predefined tables may be associated with a respective channel type (e.g., LOS or multi-path). In some examples, the scheduled entity may calculate a frequency selectivity of the wireless channel and then access a weight LUT to determine the weights corresponding to the channel frequency selectivity. For example, the CSF generation circuitry 848 shown and described above in connection with FIG. 8 may determine the weights to be applied to the predefined SPEF-CQI mappings.

At block 906, the scheduled entity may then calculate respective weighted sums of corresponding ones of the SPEF threshold values across the two or more predefined SPEF-CQI mappings using the respective weights to produce a blended SPEF-CQI mapping for the wireless channel. In some examples, the scheduled entity may multiply the respective weight associated with each predefined SPEF-CQI mapping by each of the SPEF threshold values in that SPEF-CQI mapping to produce weighted SPEF threshold values for that SPEF-CQI mapping. The scheduled entity may then add corresponding ones of the weighted SPEF threshold values across each of the SPEF-CQI mappings to produce the blended SPEF-CQI mapping for the wireless channel. For example, the CSF generation circuitry 848 shown and described above in connection with FIG. 8 may produce the blended SPEF-CQI mapping for the wireless channel.

At block 908, the scheduled entity may calculate a current SPEF value for the wireless channel. In some examples, the scheduled entity may calculate the current SPEF value as a function of one or more channel measurement and/or interference measurement resources. For example, the SPEF calculation circuitry 846 shown and described above in connection with FIG. 8 may calculate the current SPEF value for the wireless channel.

At block 910, the scheduled entity may identify a current CQI from the blended SPEF-CQI mapping that maps to the current SPEF value. In some examples, the blended SPEF-CQI mapping may include an adapted mapping between adapted SPEF threshold values and the CQI indexes. The scheduled entity may identify the maximum SPEF threshold value of the adapted SPEF threshold values in the blended SPEF-CQI mapping that is less than or equal to the current SPEF value of the wireless channel and select the current CQI corresponding to the maximum SPEF threshold value in the blended SPEF-CQI mapping. The current CQI may then be included, for example, within CSF. For example, the CSF generation circuitry 848 shown and described above in connection with FIG. 8 may identify the current CQI.

At block 912, the scheduled entity may transmit the current CQI to the scheduling entity. In some examples, the current CQI may be transmitted within the CSF to the scheduling entity. For example, the communication and processing circuitry 842, together with the transceiver 810, shown and described above in connection with FIG. 8 may transmit the current CQI to the scheduling entity.

Figure 10:
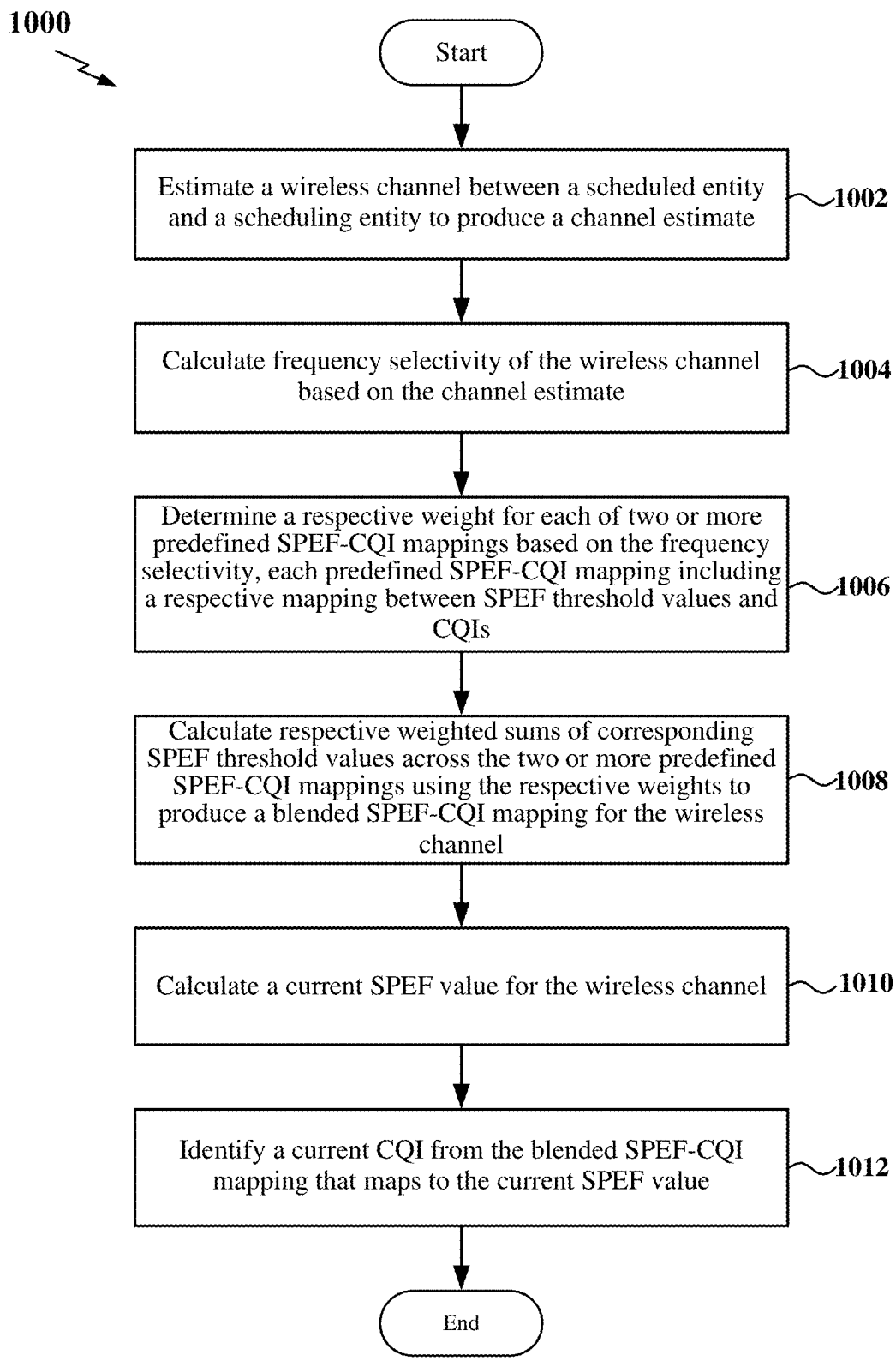
FIG. 10 is a flow chart of another exemplary method for a scheduled entity to adapt a SPEF to CQI mapping based on the channel conditions according to some aspects.

FIG. 10 is a flow chart 1000 of another exemplary method for a scheduled entity (e.g., a UE) to adapt a SPEF to CQI mapping based on the channel conditions. As described below, some or all illustrated features may be omitted in a particular implementation within the scope of the present disclosure, and some illustrated features may not be required for implementation of all embodiments. In some examples, the method may be performed by the scheduled entity 800, as described above and illustrated in FIG. 8, by a processor or processing system, or by any suitable means for carrying out the described functions.

At block 1002, the scheduled entity may estimate a wireless channel between the scheduled entity and the scheduling entity to obtain a channel estimate. In some examples, the scheduled entity may estimate the wireless channel based on one or more reference signals (e.g., CSI-RS). For example, the channel estimate may include a vector of channel response coefficients, each corresponding to a pilot within a CSI-RS channel measurement resource. For example, the channel estimation circuitry 844, communication and processing circuitry 842, and transceiver 810 shown and described above in connection with FIG. 8 may receive the one or more reference signals and estimate the wireless channel based on the one or more reference signals.

At block 1004, the scheduled entity may calculate a frequency selectivity of the channel. The frequency selectivity may be calculated based on the channel estimate. In some examples, the frequency selectivity may be calculated in the frequency domain or in the time domain (e.g., as a power delay profile correlation). For example, the CSF generation circuitry 848 shown and described above in connection with FIG. 8 may calculate the frequency selectivity of the channel.

At block 1006, the scheduled entity may determine a respective weight for each of two or more predefined SPEF-CQI mappings based on the frequency selectivity. Each predefined SPEF-CQI mapping may include, for example, a respective mapping between SPEF threshold values and CQI indexes. In some examples, each of the SPEF-CQI mappings may be a predefined table. Each of the predefined tables may be associated with a respective channel type (e.g., LOS or multi-path). In some examples, the scheduled entity may access a weight LUT to determine the weights corresponding to the channel frequency selectivity. For example, the CSF generation circuitry 848 shown and described above in connection with FIG. 8 may determine the weights to be applied to the predefined SPEF-CQI mappings.

At block 1008, the scheduled entity may then calculate respective weighted sums of corresponding ones of the SPEF threshold values across the two or more predefined SPEF-CQI mappings using the respective weights to produce a blended SPEF-CQI mapping for the wireless channel. In some examples, the scheduled entity may multiply the respective weight associated with each predefined SPEF-CQI mapping by each of the SPEF threshold values in that SPEF-CQI mapping to produce weighted SPEF threshold values for that SPEF-CQI mapping. The scheduled entity may then add corresponding ones of the weighted SPEF threshold values across each of the SPEF-CQI mappings to produce the blended SPEF-CQI mapping for the wireless channel. For example, the CSF generation circuitry 848 shown and described above in connection with FIG. 8 may produce the blended SPEF-CQI mapping for the wireless channel.

At block 1010, the scheduled entity may calculate a current SPEF value for the wireless channel. In some examples, the scheduled entity may calculate the current SPEF value as a function of one or more channel measurement and/or interference measurement resources. For example, the SPEF calculation circuitry 846 shown and described above in connection with FIG. 8 may calculate the current SPEF value for the wireless channel.

At block 1012, the scheduled entity may identify a current CQI from the blended SPEF-CQI mapping that maps to the current SPEF value. In some examples, the blended SPEF-CQI mapping may include an adapted mapping between adapted SPEF threshold values and the CQI indexes. The scheduled entity may identify the maximum SPEF threshold value of the adapted SPEF threshold values in the blended SPEF-CQI mapping that is less than or equal to the current SPEF value of the wireless channel and select the current CQI corresponding to the maximum SPEF threshold value in the blended SPEF-CQI mapping. The current CQI may then be fed back to a scheduled entity within CSF. For example, the CSF generation circuitry 848 shown and described above in connection with FIG. 8 may identify the current CQI.

Figure 11:
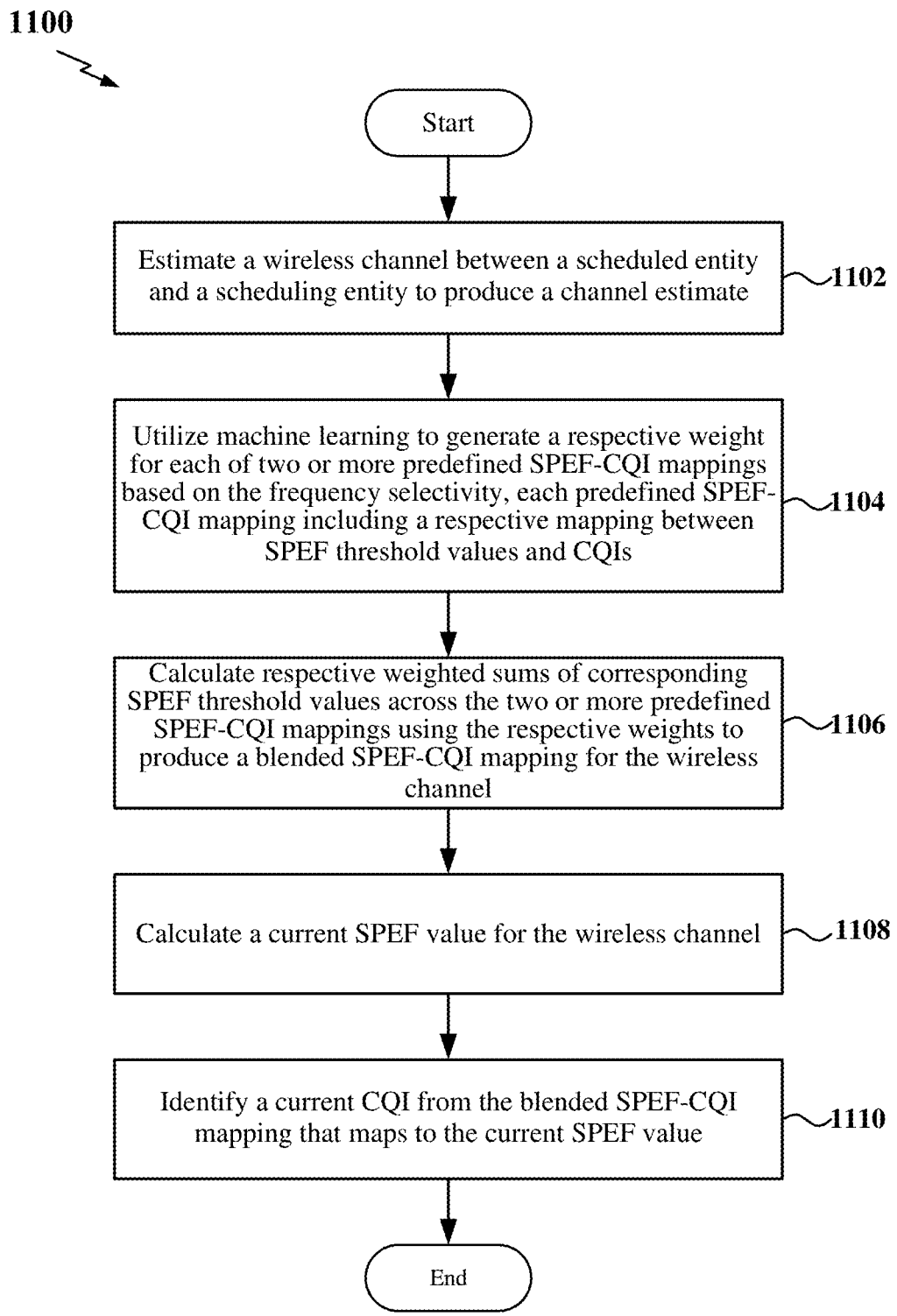
FIG. 11 is a flow chart of another exemplary method for a scheduled entity to adapt a SPEF to CQI mapping based on the channel conditions according to some aspects.

FIG. 11 is a flow chart 1100 of another exemplary method for a scheduled entity (e.g., a UE) to adapt a SPEF to CQI mapping based on the channel conditions. As described below, some or all illustrated features may be omitted in a particular implementation within the scope of the present disclosure, and some illustrated features may not be required for implementation of all embodiments. In some examples, the method may be performed by the scheduled entity 800, as described above and illustrated in FIG. 8, by a processor or processing system, or by any suitable means for carrying out the described functions.

At block 1102, the scheduled entity may estimate a wireless channel between the scheduled entity and the scheduling entity to obtain a channel estimate. In some examples, the scheduled entity may estimate the channel based on one or more reference signals (e.g., CSI-RS). For example, the channel estimate may include a vector of channel response coefficients, each corresponding to a pilot within a CSI-RS channel measurement resource. For example, the channel estimation circuitry 844, communication and processing circuitry 842, and transceiver 810 shown and described above in connection with FIG. 8 may receive the one or more reference signals and estimate the channel based on the one or more reference signals.

At block 1104, the scheduled entity may utilize machine learning to generate a respective weight for each of two or more predefined SPEF-CQI mappings based on the channel estimate. Each predefined SPEF-CQI mapping may include, for example, a respective mapping between SPEF threshold values and CQI indexes. In some examples, each of the SPEF-CQI mappings may be a predefined table. Each of the predefined tables may be associated with a respective channel type (e.g., LOS or multi-path). In some examples, the scheduled entity may include a neural network trained such that the output determines the set of weights for the current wireless channel based on the channel estimate. For example, the CSF generation circuitry 848 shown and described above in connection with FIG. 8 may determine the weights to be applied to the predefined tables.

At block 1106, the scheduled entity may then calculate respective weighted sums of corresponding ones of the SPEF threshold values across the two or more predefined SPEF-CQI mappings using the respective weights to produce a blended SPEF-CQI mapping for the wireless channel. In some examples, the scheduled entity may multiply the respective weight associated with each predefined SPEF-CQI mapping by each of the SPEF threshold values in that SPEF-CQI mapping to produce weighted SPEF threshold values for that SPEF-CQI mapping. The scheduled entity may then add corresponding ones of the weighted SPEF threshold values across each of the SPEF-CQI mappings to produce the blended SPEF-CQI mapping for the wireless channel. In other examples, the scheduled entity may utilize machine learning to generate the blended SPEF-CQI mapping based on the channel estimate and/or weights. For example, the CSF generation circuitry 848 shown and described above in connection with FIG. 8 may produce the blended SPEF-CQI mapping for the wireless channel.

At block 1108, the scheduled entity may calculate a current SPEF value for the wireless channel. In some examples, the scheduled entity may calculate the current SPEF value as a function of one or more channel measurement and/or interference measurement resources. For example, the SPEF calculation circuitry 846 shown and described above in connection with FIG. 8 may calculate the current SPEF value for the wireless channel.

At block 1110, the scheduled entity may identify a current CQI from the blended SPEF-CQI mapping that maps to the current SPEF value. In some examples, the blended SPEF-CQI mapping may include an adapted mapping between adapted SPEF threshold values and the CQI indexes. The scheduled entity may identify the maximum SPEF threshold value of the adapted SPEF threshold values in the blended SPEF-CQI mapping that is less than or equal to the current SPEF value of the wireless channel and select the current CQI corresponding to the maximum SPEF threshold value in the blended SPEF-CQI mapping. The current CQI may then be fed back to the scheduled entity within CSF. For example, the CSF generation circuitry 848 shown and described above in connection with FIG. 8 may identify the current CQI.

The processes shown in FIGS. 9-11 may include additional aspects, such as any single aspect or any combination of aspects described below and/or in connection with one or more other processes described elsewhere herein.

In a first aspect, a scheduled entity (e.g., a UE) may produce a blended SPEF-CQI mapping from two or more predefined SPEF-CQI mappings. Here, each of the two or more predefined SPEF-CQI mappings includes a respective mapping between SPEF threshold values and CQIs. The scheduled entity may multiply respective weights for each of the two or more predefined SPEF-CQI mappings by each of the SPEF threshold values within corresponding ones of the two or more predefined SPEF-CQI mappings to produce weighted SPEF threshold values and add corresponding ones of the weighted SPEF threshold values across each of the two or more predefined SPEF-CQI mappings to produce the blended SPEF-CQI mapping.

In a second aspect, alone or in combination with the first aspect, the two or more predefined SPEF-CQI mappings include two or more predefined tables.

In a third aspect, alone or in combination with one or more of the first and second aspects, each of the two or more predefined tables is associated with a respective channel type.

In a fourth aspect, alone or in combination with one or more of the first through third aspects, the scheduled entity may calculate a frequency selectivity of the wireless channel based on a channel estimate of the wireless channel between the scheduled entity and a scheduling entity.

In a fifth aspect, alone or in combination with one or more of the first through fourth aspects, the scheduled entity may calculate a frequency selectivity of the wireless channel based on a channel estimate of the wireless channel and determine the respective weight associated with each of the two or more predefined SPEF-CQI mappings based on the frequency selectivity of the wireless channel.

In a sixth aspect, alone or in combination with one or more of the first through fifth aspects, the scheduled entity may access a look-up table within the scheduled entity to determine the respective weight associated with each of the two or more predefined SPEF-CQI mappings based on the frequency selectivity.

In a seventh aspect, alone or in combination with one or more of the first through sixth aspects, the scheduled entity may receive a channel state information-reference signal (CSI-RS) within a channel measurement resource from the scheduling entity. The scheduled entity may further estimate the wireless channel based on the CSI-RS.

In an eighth aspect, alone or in combination with one or more of the first through seventh aspects, the scheduled entity may utilize machine learning to generate the respective weight associated with each of the two or more predefined SPEF-CQI mappings based on the channel estimate.

In a ninth aspect, alone or in combination with one or more of the first through eighth aspects, the blended SPEF-CQI mapping may include an adapted mapping between adapted SPEF threshold values and the CQIs. The scheduled entity may select the current CQI corresponding to a maximum SPEF threshold value of the adapted SPEF threshold values that is less than or equal to the current SPEF value.

In one configuration, a scheduled entity includes means for estimating a wireless channel between the scheduled entity and a scheduling entity to obtain a channel estimate and means for determining a respective weight for each of two or more predefined spectral efficiency-channel quality indicator (SPEF-CQI) mappings based on the channel estimate. Each of the two or more predefined SPEF-CQI mappings can include a respective mapping between spectral efficiency (SPEF) threshold values and channel quality indicators (CQIs). The scheduled entity also includes means for calculating respective weighted sums of corresponding ones of the SPEF threshold values across the two or more predefined SPEF-CQI mappings using the respective weights to produce a blended SPEF-CQI mapping for the wireless channel, means for calculating a current SPEF value for the wireless channel, and means for identifying a current CQI from the blended SPEF-CQI mapping that maps to the current SPEF value.

In one aspect, the aforementioned means for estimating the wireless channel between the scheduled entity and a scheduling entity to obtain the channel estimate, means for determining a respective weight for each of two or more predefined SPEF-CQI mappings based on the channel estimate, means for calculating respective weighted sums of corresponding ones of the SPEF threshold values across the two or more predefined SPEF-CQI mappings using the respective weights to produce a blended SPEF-CQI mapping for the wireless channel, means for calculating a current SPEF value for the wireless channel, and means for identifying a current CQI from the blended SPEF-CQI mapping that maps to the current SPEF value may be the processor(s) 804 shown in FIG. 8 configured to perform the functions recited by the aforementioned means.

For example, the aforementioned means for estimating the wireless channel may include the channel estimation circuitry 844, communication and processing circuitry 842, and transceiver 810 shown in FIG. 8. As another example, the aforementioned means for determining a respective weight for each of two or more predefined SPEF-CQI mappings based on the channel estimate, means for calculating respective weighted sums of corresponding ones of the SPEF threshold values across the two or more predefined SPEF-CQI mappings using the respective weights to produce a blended SPEF-CQI mapping for the wireless channel, and means for identifying a current CQI from the blended SPEF-CQI mapping that maps to the current SPEF value may include the CSF generation circuitry 848 shown in FIG. 8. In another example, the aforementioned means for calculating a current SPEF value for the wireless channel may include the SPEF calculation circuitry 846, communication and processing circuitry 842, and transceiver 810 shown in FIG. 8. In another aspect, the aforementioned means may be a circuit or any apparatus configured to perform the functions recited by the aforementioned means.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-11 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 4, 5, 7, and 8 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication at a scheduled entity in a wireless communication network, the method comprising:
    estimating a wireless channel between the scheduled entity and a scheduling entity to obtain a channel estimate;
    determining a respective weight associated with each of two or more predefined spectral efficiency-channel quality indicator (SPEF-CQI) mappings based on the channel estimate, wherein each of the two or more predefined SPEF-CQI mappings comprises a respective mapping between spectral efficiency (SPEF) threshold values and channel quality indicators (CQIs);
    calculating respective weighted sums of corresponding ones of the SPEF threshold values across the two or more predefined SPEF-CQI mappings using the respective weights to produce a blended SPEF-CQI mapping for the wireless channel;
    calculating a current SPEF value for the wireless channel;
    identifying a current CQI from the blended SPEF-CQI mapping that maps to the current SPEF value; and
    transmitting the current CQI to the scheduling entity.

2. The method of claim 1, wherein calculating respective weighted sums of corresponding ones of the SPEF threshold values across the two or more predefined SPEF-CQI mappings further comprises:
    multiplying the respective weights by each of the SPEF threshold values within corresponding ones of the two or more predefined SPEF-CQI mappings to produce weighted SPEF threshold values; and
    adding corresponding ones of the weighted SPEF threshold values across each of the two or more predefined SPEF-CQI mappings to produce the blended SPEF-CQI mapping.

3. The method of claim 1, wherein the two or more predefined SPEF-CQI mappings comprise two or more predefined tables.

4. The method of claim 3, wherein each of the two or more predefined tables is associated with a respective channel type.

5. The method of claim 1, further comprising:
    calculating a frequency selectivity of the wireless channel based on the channel estimate.

6. The method of claim 5, wherein determining the respective weight associated with each of the two or more predefined SPEF-CQI mappings further comprises:
    accessing a look-up table to determine the respective weight associated with each of the two or more predefined SPEF-CQI mappings based on the frequency selectivity.

7. The method of claim 1, wherein estimating the wireless channel further comprises:
    receiving a channel state information-reference signal (CSI-RS) within a channel measurement resource from the scheduling entity; and
    estimating the wireless channel based on the CSI-RS.

8. The method of claim 1, wherein determining the respective weight associated with each of the two or more predefined SPEF-CQI mappings further comprises:
 utilizing machine learning to generate the respective weight associated with each of the two or more predefined SPEF-CQI mappings based on the channel estimate.

9. The method of claim 1, wherein the blended SPEF-CQI mapping comprises an adapted mapping between adapted SPEF threshold values and the CQIs, and wherein identifying the current CQI further comprises:
 selecting the current CQI corresponding to a maximum SPEF threshold value of the adapted SPEF threshold values that is less than or equal to the current SPEF value.

10. A scheduled entity in a wireless communication network, comprising:
 a wireless transceiver;
 a memory; and
 a processor communicatively coupled to the wireless transceiver and the memory, wherein the processor is configured to:
  estimate a wireless channel between the scheduled entity and a scheduling entity to obtain a channel estimate;
  determine a respective weight associated with each of two or more predefined spectral efficiency-channel quality indicator (SPEF-CQI) mappings based on the channel estimate, wherein each of the two or more predefined SPEF-CQI mappings comprises a respective mapping between spectral efficiency (SPEF) threshold values and channel quality indicators (CQIs);
  calculate respective weighted sums of corresponding ones of the SPEF threshold values across the two or more predefined SPEF-CQI mappings using the respective weights to produce a blended SPEF-CQI mapping for the wireless channel;
  calculate a current SPEF value for the wireless channel;
  identify a current CQI from the blended SPEF-CQI mapping that maps to the current SPEF value; and
  transmit the current CQI to the scheduling entity via the wireless transceiver.

11. The scheduled entity of claim 10, wherein the processor is further configured to:
 multiply the respective weights by each of the SPEF threshold values within corresponding ones of the two or more predefined SPEF-CQI mappings to produce weighted SPEF threshold values; and
 add corresponding ones of the weighted SPEF threshold values across each of the two or more predefined SPEF-CQI mappings to produce the blended SPEF-CQI mapping.

12. The scheduled entity of claim 10, wherein the two or more predefined SPEF-CQI mappings comprise two or more predefined tables.

13. The scheduled entity of claim 12, wherein each of the two or more predefined tables is associated with a respective channel type.

14. The scheduled entity of claim 10, wherein the processor is further configured to:
 calculate a frequency selectivity of the wireless channel based on the channel estimate; and
 access a look-up table to determine the respective weight associated with each of the two or more predefined SPEF-CQI mappings based on the frequency selectivity.

15. The scheduled entity of claim 10, wherein the processor is further configured to:
 receive a channel state information-reference signal (CSI-RS) within a channel measurement resource from the scheduling entity; and
 estimate the wireless channel based on the CSI-RS.

16. The scheduled entity of claim 10, wherein the processor is further configured to:
 utilize machine learning to generate the respective weight associated with each of the two or more predefined SPEF-CQI mappings based on the channel estimate.

17. The scheduled entity of claim 10, wherein the blended SPEF-CQI mapping comprises an adapted mapping between adapted SPEF threshold values and the CQIs, and wherein the processor is further configured to:
 select the current CQI corresponding to a maximum SPEF threshold value of the adapted SPEF threshold values that is less than or equal to the current SPEF value.

18. A scheduled entity in a wireless communication network, comprising:
 means for estimating a wireless channel between the scheduled entity and a scheduling entity to obtain a channel estimate;
 means for determining a respective weight associated with each of two or more predefined spectral efficiency-channel quality indicator (SPEF-CQI) mappings based on the channel estimate, wherein each of the two or more predefined SPEF-CQI mappings comprises a respective mapping between spectral efficiency (SPEF) threshold values and channel quality indicators (CQIs);
 means for calculating respective weighted sums of corresponding ones of the SPEF threshold values across the two or more predefined SPEF-CQI mappings using the respective weights to produce a blended SPEF-CQI mapping for the wireless channel;
 means for calculating a current SPEF value for the wireless channel;
 means for identifying a current CQI from the blended SPEF-CQI mapping that maps to the current SPEF value; and
 means for transmitting the current CQI to the scheduling entity.

19. The scheduled entity of claim 18, wherein the means for calculating the respective weighted sums of corresponding ones of the SPEF threshold values across the two or more predefined SPEF-CQI mappings further comprises:
 means for multiplying the respective weights by each of the SPEF threshold values within corresponding ones of the two or more predefined SPEF-CQI mappings to produce weighted SPEF threshold values; and
 means for adding corresponding ones of the weighted SPEF threshold values across each of the two or more predefined SPEF-CQI mappings to produce the blended SPEF-CQI mapping.

20. The scheduled entity of claim 18, wherein the means for determining the respective weight associated with each of the two or more predefined SPEF-CQI mappings further comprising:
 means for calculating a frequency selectivity of the wireless channel based on the channel estimate; and
 means for determining the respective weight associated with each of the two or more predefined SPEF-CQI mappings based on the frequency selectivity of the wireless channel.

21. The scheduled entity of claim 18, wherein the means for estimating the wireless channel further comprises:

means for receiving a channel state information-reference signal (CSI-RS) within a channel measurement resource from the scheduling entity; and means for estimating the wireless channel based on the CSI-RS.

22. The scheduled entity of claim 18, wherein the means for determining the respective weight associated with each of the two or more predefined SPEF-CQI mappings further comprises:

means for utilizing machine learning to generate the respective weight associated with each of the two or more predefined SPEF-CQI mappings based on the channel estimate.

23. The scheduled entity of claim 18, wherein the blended SPEF-CQI mapping comprises an adapted mapping between adapted SPEF threshold values and the CQIs, and wherein the means for identifying the current CQI further comprises:

means for selecting the current CQI corresponding to a maximum SPEF threshold value of the adapted SPEF threshold values that is less than or equal to the current SPEF value.

24. A non-transitory computer-readable medium storing computer-executable code, comprising code for causing a scheduled entity to:

estimate a wireless channel between the scheduled entity and a scheduling entity to obtain a channel estimate;

determine a respective weight associated with each of two or more predefined spectral efficiency-channel quality indicator (SPEF-CQI) mappings based on the channel estimate, wherein each of the two or more predefined SPEF-CQI mappings comprises a respective mapping between spectral efficiency (SPEF) threshold values and channel quality indicators (CQIs);

calculate respective weighted sums of corresponding ones of the SPEF threshold values across the two or more predefined SPEF-CQI mappings using the respective weights to produce a blended SPEF-CQI mapping for the wireless channel;

calculate a current SPEF value for the wireless channel;

identify a current CQI from the blended SPEF-CQI mapping that maps to the current SPEF value; and transmit the current CQI to the scheduling entity.

25. The non-transitory computer-readable medium of claim 24, further comprising code for causing the scheduled entity to:

multiply the respective weights by each of the SPEF threshold values within corresponding ones of the two or more predefined SPEF-CQI mappings to produce weighted SPEF threshold values; and add corresponding ones of the weighted SPEF threshold values across each of the two or more predefined SPEF-CQI mappings to produce the blended SPEF-CQI mapping.

26. The non-transitory computer-readable medium of claim 24, wherein the two or more predefined SPEF-CQI mappings comprise two or more predefined tables, each of the two or more predefined tables being associated with a respective channel type.

27. The non-transitory computer-readable medium of claim 24, further comprising code for causing the scheduled entity to:

calculate a frequency selectivity of the wireless channel based on the channel estimate; and determine the respective weight associated with each of the two or more predefined SPEF-CQI mappings based on the frequency selectivity of the wireless channel.

28. The non-transitory computer-readable medium of claim 24, further comprising code for causing the scheduled entity to:

receive a channel state information-reference signal (CSI-RS) within a channel measurement resource from the scheduling entity; and estimate the wireless channel based on the CSI-RS.

29. The non-transitory computer-readable medium of claim 24, further comprising code for causing the scheduled entity to:

utilize machine learning to generate the respective weights associated with each of the two or more predefined SPEF-CQI mappings based on the channel estimate.

30. The non-transitory computer-readable medium of claim 22, wherein the blended SPEF-CQI mapping comprises an adapted mapping between adapted SPEF threshold values and the CQIs, and further comprising code for causing the scheduled entity to:

select the current CQI corresponding a maximum SPEF threshold value of the adapted SPEF threshold values that is less than or equal to the current SPEF value.

* * * * *